United States Patent
Drews et al.

(10) Patent No.: US 11,002,629 B2
(45) Date of Patent: *May 11, 2021

(54) PRESSURE AND LEAK TESTING METHODS

(71) Applicant: Illumina, Inc., San Diego, CA (US)

(72) Inventors: Bradley Kent Drews, Poway, CA (US);
Kevin James Cappa, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/551,580

(22) Filed: Aug. 26, 2019

(65) Prior Publication Data

US 2019/0376870 A1    Dec. 12, 2019

Related U.S. Application Data

(63) Continuation of application No. 15/841,089, filed on Dec. 13, 2017, now Pat. No. 10,393,613.
(Continued)

(30) Foreign Application Priority Data

Mar. 24, 2017 (GB) ...................................... 1704763

(51) Int. Cl.
*G05B 15/02* (2006.01)
*G01M 3/26* (2006.01)
(Continued)

(52) U.S. Cl.
CPC .............. *G01M 3/26* (2013.01); *G05B 15/02* (2013.01); *G05D 7/0676* (2013.01); *G05D 16/2066* (2013.01)

(58) Field of Classification Search
CPC ........ F17C 2250/032; F17C 2205/0335; F17C 2205/0352; G05B 15/02; G05D 16/2066;
(Continued)

(56) References Cited

U.S. PATENT DOCUMENTS 9,404,902 B2    8/2016 Blomberg et al.
10,393,613 B2 *  8/2019 Drews .................. G05D 7/0676
(Continued)

FOREIGN PATENT DOCUMENTS

TW     201517993    5/2015
TW     201522824    6/2015
(Continued)

OTHER PUBLICATIONS

U.S. Office Action dated Jan. 11, 2019 issued in U.S. Appl. No. 15/841,089.
(Continued)

*Primary Examiner* — Michael J Brown
(74) *Attorney, Agent, or Firm* — Illumina, Inc.

(57) ABSTRACT

An analysis system includes a fluidic system includes a number of components that are interconnected to form a fluidic system having a plurality of flow paths. An example method of pressure testing the fluidic system includes (a) selecting a flow path from the plurality of flow paths through a flow cell in accordance with a prescribed test protocol; (b) actuating a pump to pressurize a fluid in the selected flow path; (c) generating pressure data representative of the pressure in the selected flow path; and (d) processing the pressure data to determine whether the selected flow path maintains pressure in a desired manner.

20 Claims, 16 Drawing Sheets

Related U.S. Application Data

(60) Provisional application No. 62/442,542, filed on Jan. 5, 2017.

(51) Int. Cl.
*G05D 7/06* (2006.01)
*G05D 16/20* (2006.01)
*G06F 8/10* (2018.01)

(58) Field of Classification Search
CPC ..... G05D 7/0676; G06F 11/3684; G06F 8/10; G01M 3/26
USPC ......................................................... 700/282
See application file for complete search history.

(56) References Cited

U.S. PATENT DOCUMENTS

| | | |
|---|---|---|
| 2006/0129084 A1 | 6/2006 | Miyato |
| 2010/0111768 A1 | 5/2010 | Banerjee et al. |
| 2010/0187115 A1 | 7/2010 | Posner et al. |
| 2011/0072914 A1 | 3/2011 | Lebl et al. |
| 2011/0308259 A1 | 12/2011 | Wray et al. |
| 2013/0101438 A1 | 4/2013 | Cedrone et al. |
| 2013/0260372 A1 | 10/2013 | Buermann et al. |
| 2015/0075632 A1 | 3/2015 | Wray et al. |
| 2015/0203967 A1 | 7/2015 | Dhas et al. |
| 2016/0153441 A1 | 6/2016 | Fehr et al. |
| 2018/0188131 A1 | 7/2018 | Drews et al. |

FOREIGN PATENT DOCUMENTS

| | | |
|---|---|---|
| TW | 201533366 | 9/2015 |
| TW | 201602392 | 1/2016 |
| TW | 201613018 | 4/2016 |
| WO | 2001/066245 | 9/2001 |
| WO | WO 2009/102688 | 8/2009 |

OTHER PUBLICATIONS

U.S. Notice of Allowance dated May 15, 2019 issued in U.S. Appl. No. 15/841,089.
GB Search Report, dated Oct. 2, 2017, in Application No. GB1704763.0.
International Search Report and Written Opinion dated Apr. 23, 2018 issued in PCT/US2017/067839.
International Preliminary Report on Patentability dated Jul. 9, 2019 issued in PCT/US2017/067839.
European Extended Search Report in Application No. 17889858.1, dated Jul. 27, 2020.

* cited by examiner

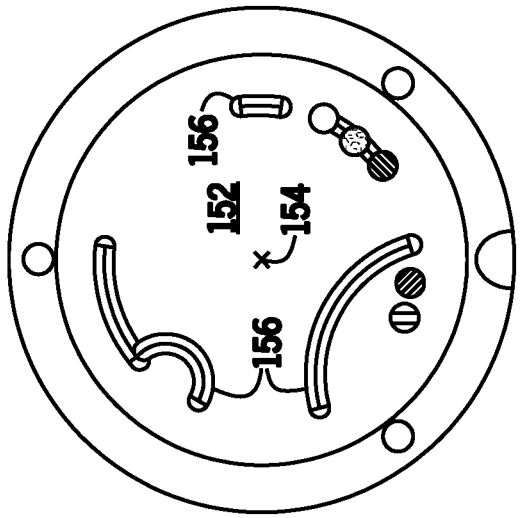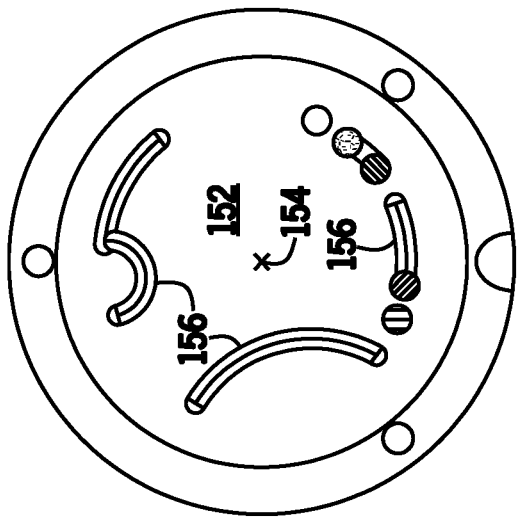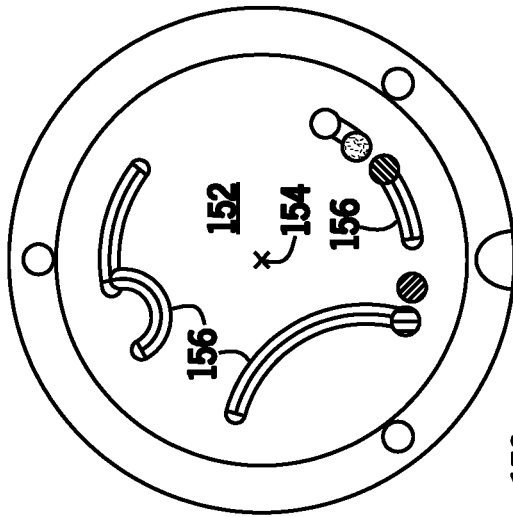

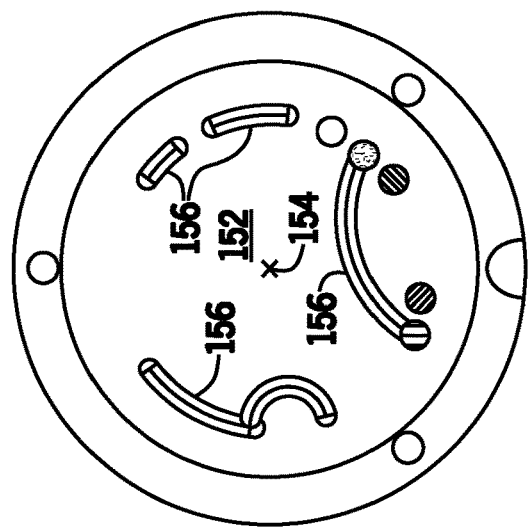
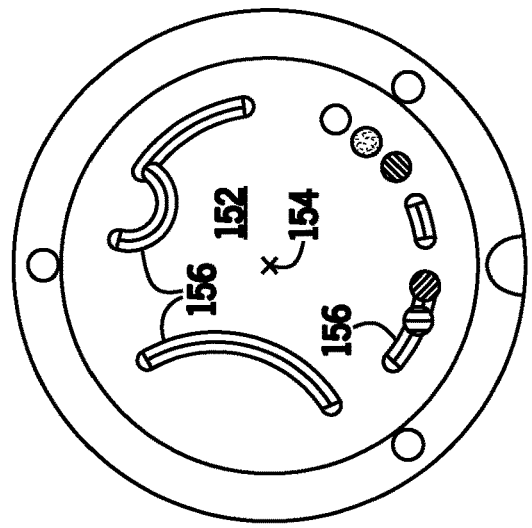
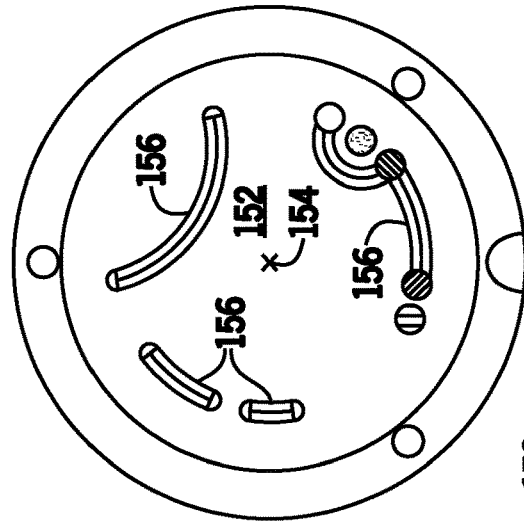

PRESSURE AND LEAK TESTING METHODS

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Instruments have been developed and continue to evolve for sequencing molecules of interest, particularly DNA, RNA and other biological samples. In advance of sequencing operations, samples of the molecules of interest are prepared in order to form a library or template which will be mixed with reagents and ultimately introduced into a flow cell where individual molecules will attach at sites and be amplified to enhance detectability. The sequencing operation, then, includes repeating a cycle of steps to bind the molecules at the sites, tag the bound components, image the components at the sites, and process the resulting image data.

In such sequencing systems, fluidic systems (or subsystems) provide the flow of substances (e.g., the reagents) under the control of a control system, such as a programmed computer and appropriate interfaces.

SUMMARY

Details of one or more implementations of the subject matter described in this specification are set forth in the accompanying drawings and the description below. Other features, aspects, and advantages will become apparent from the description, the drawings, and the claims.

In some implementations, a system may be provided that includes an interface to fluidically connect with a flow cell that to support analytes of interest in an analysis system, the fluidic interface including a plurality of flow paths and a plurality of effluent lines, each flow path to fluidically connect with one or more channels of the flow cell when the flow cell is mounted in the analysis system and each effluent line to fluidically connect with one of the channels of the flow cell when the flow cell is mounted in the analysis system; a selector valve fluidically connected with plurality of flow paths, the selector valve to controllably select one of the flow paths; one or more pumps, each pump fluidically connected with one or more of the effluent lines; a pressure sensor in fluidic communication with the selected flow path, the pressure sensor to detect pressure in the selected flow path and to generate pressure data based on the detected pressure; and control circuitry, the control circuity having one or more processors and a memory to store, or storing, computer-executable instructions which, when executed by the one or more processors, control the one or more processors to: control the one or more pumps so as to pressurize the selected flow path according to a prescribed test protocol; and access the pressure data and to determine whether the selected flow path maintains pressure in a desired manner.

In some implementations of the system, the one or more pumps may include at least one syringe pump. In some implementations of the system, the fluid may include air.

In some implementations of the system, the memory may be to store, or may store, further computer-executable instructions which, when executed by the one or more processors, further control the one or more processors to cause the one or more pumps to pressurize the selected flow path in a stepwise manner, with each pressure step having a higher pressure than the previous pressure step.

In some implementations of the system, the memory may be to store, or may store, further computer-executable instructions which, when executed by the one or more processors, further control the one or more processors to cause the selector valve to successively select different flow paths of the plurality of flow paths to be pressure-tested in accordance with the prescribed test protocol.

In some implementations of the system, the plurality of flow paths may include a first flow path through one channel of the flow cell when the flow cell is mounted to the interface, and a second flow path through a second channel of the flow cell when the flow cell is mounted to the interface, in which the second flow path may be different from the first flow path.

In some implementations of the system, the plurality of flow paths may include a third flow path that includes both the first and the second flow paths.

In some implementations of the system, the selector valve may be further fluidically connected with a bypass line that bypasses the flow cell, and the memory may be to store, or may store, further computer-executable instructions which, when executed by the one or more processors, further control the one or more processors to cause the selector valve to select the bypass line to be pressure-tested in accordance with the prescribed test protocol.

In some implementations of the system, the system may include a second valve that is fluidically connected with an inlet to the selector valve, in which the second valve is to seal the selected flow path at the second valve for pressure-testing of the selected flow path between the second valve and the pump.

In some implementations, a system may be provided that includes a flow cell to support analytes of interest; a selector valve fluidically connected with the flow cell, the selector valve to controllably select a flow path through the flow cell from a plurality of flow paths through the flow cell that are selectable by the selector valve; one or more pumps fluidically connected with the flow cell, the one or more pumps to pressurize a fluid in the selected flow path in accordance with a prescribed test protocol; a pressure sensor fluidically connected with the selected flow path, the pressure sensor to detect pressure in the selected flow path and to generate pressure data based on the detected pressure; and control circuitry, the control circuitry having one or more processors and a memory to store, or storing, computer-executable instructions which, when executed by the one or more processors, control the one or more processors to: cause the selector valve to successively select different flow paths of the plurality of flow paths through the flow cell in accordance with the prescribed test protocol, cause the one or more pumps to be actuated so as to successively pressurize the selected flow paths in accordance with the prescribed test protocol, access the pressure data, and determine whether each of the selected flow paths maintains pressure in a desired manner based on the pressure data.

In some implementations of the system, the fluid may include air.

In some implementations of the system, the memory may be to store, or may store, further computer-executable instructions which, when executed by the one or more processors, further control the one or more processors to cause the one or more pumps to pressurize each of the selected flow paths in a stepwise manner using a plurality of pressure steps, with each pressure step for each selected flow path having a higher pressure than the previous pressure step for that selected flow path.

In some implementations of the system, the plurality of flow paths may include a first flow path through one channel of the flow cell and a second flow path through a second channel of the flow cell, in which the second flow path may be different from the first flow path.

In some implementations of the system, the plurality of flow paths may include a third flow path that includes both the first and the second flow paths.

In some implementations of the system, the selector valve may be further fluidically connected with a bypass line that bypasses the flow cell, and the selector valve may be controllable to select the bypass line to be pressure tested in accordance with the prescribed test protocol.

In some implementations, a method may be provided that includes implementing a stored prescribed test protocol that includes: (a) selecting a flow path from a plurality of flow paths through a flow cell in accordance with the prescribed test protocol; (b) actuating a pump to pressurize a fluid in the selected flow path; (c) generating pressure data representative of the pressure in the selected flow path; and (d) processing the pressure data representative of the pressure in the selected flow path to determine whether the selected flow path maintains pressure in a desired manner.

In some implementations of the method, actuating the pump may include actuating the pump to pressurize the selected flow path in a stepwise manner using a plurality of pressure steps.

In some implementations of the method, the method may further include repeating (a)-(d) for different flow paths through the flow cell to separately determine whether each selected flow path maintains pressure in a desired manner.

In some implementations of the method, the plurality of flow paths may include a first flow path through one channel of the flow cell and a second flow path through a second channel of the flow cell, in which the second flow path may be different from the first flow path.

In some implementations of the method, the method may further include selecting a bypass line to be pressure tested in accordance with the prescribed test protocol, actuating the pump to pressurize a fluid in the bypass line, generating pressure data representative of the pressure in the bypass line, and processing the pressure data representative of the pressure in the bypass line to determine whether the bypass line maintains pressure in a desired manner, in which the bypass line may not flow through the flow cell.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 6A-F are cross-sectional diagrams of an implementation of an example common line selection valve of the fluidic system illustrated in FIG. 4 in various positions;

DETAILED DESCRIPTION

Figure 1:
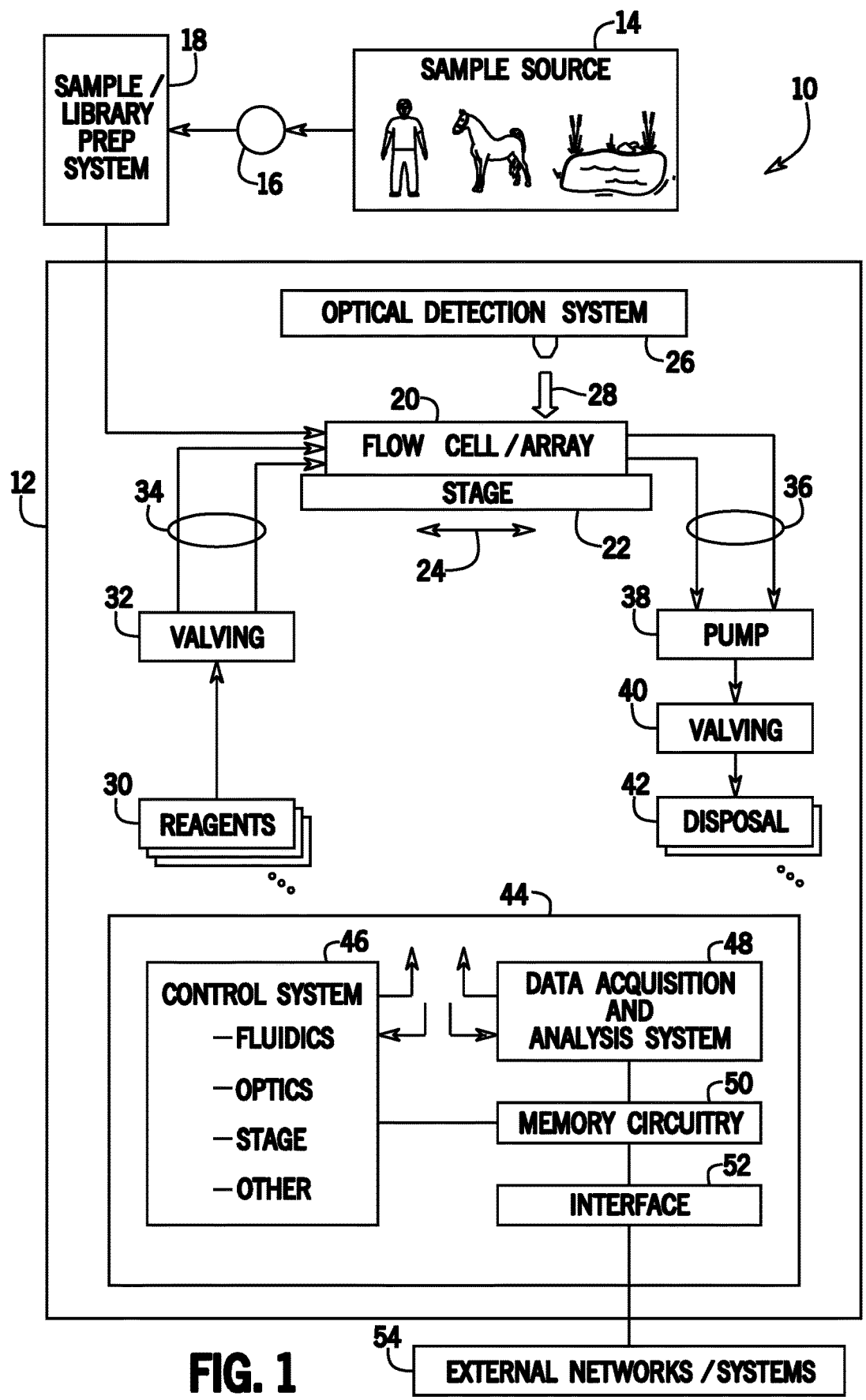
FIG. 1 is a diagrammatical overview of an example sequencing system in which the disclosed techniques may be employed.

FIG. 1 illustrates an implementation of a sequencing system 10 configured to process molecular samples that may be sequenced to determine their components, the component ordering, and generally the structure of the sample. The system includes an instrument 12 that receives and processes a biological sample. A sample source 14 provides the sample 16 which in many cases will include a tissue sample. The sample source may include, for example, an individual or subject, such as a human, animal, microorganism, plant, or other donor (including environmental samples), or any other subject that includes organic molecules of interest, the sequence of which is to be determined. The system may be used with samples other than those taken from organisms, including synthesized molecules. In many cases, the molecules will include DNA, RNA, or other molecules having base pairs the sequence of which may define genes and variants having particular functions of ultimate interest.

The sample 16 is introduced into a sample/library preparation system 18. This system may isolate, break, and otherwise prepare the sample for analysis. The resulting library includes the molecules of interest in lengths that facilitate the sequencing operation. The resulting library is then provided to the instrument 12 where the sequencing operation is performed. In practice, the library, which may sometimes be referred to as a template, is combined with reagents in an automated or semi-automated process, and then introduced to the flow cell prior to sequencing.

In the implementation illustrated in FIG. 1, the instrument includes a flow cell or array 20 that receives the sample library. The flow cell includes one or more fluidic channels, also referred to herein as lanes, that allow for sequencing chemistry to occur, including attachment of the molecules of the library, and amplification at locations or sites that can be detected during the sequencing operation. For example, the flow cell/array 20 may include sequencing templates immobilized on one or more surfaces at the locations or sites. A "flow cell" may include a patterned array, such as a microarray, a nanoarray, and so forth. In practice, the locations or sites may be disposed in a regular, repeating pattern, a complex non-repeating pattern, or in a random arrangement on one or more surfaces of a support. To enable the sequencing chemistry to occur, the flow cell also allows for introduction of substances, such as including various reagents, buffers, and other reaction media, that are used for reactions, flushing, and so forth. The substances flow through the flow cell and may contact the molecules of interest at the individual sites.

In the instrument the flow cell 20 is mounted on a movable stage 22 that, in this implementation, may be moved in one or more directions as indicated by reference numeral 24. The flow cell 20 may, for example, be provided in the form of a removable and replaceable cartridge that may interface with ports on the movable stage 22 or other components of the system in order to allow reagents and other fluids to be delivered to or from the flow cell 20. The stage is associated with an optical detection system 26 that can direct radiation or light 28 to the flow cell during sequencing. The optical detection system may employ various methods, such as fluorescence microscopy methods, for detection of the analytes disposed at the sites of the flow cell. By way of a non-limiting example, the optical detection system 26 may employ confocal line scanning to produce progressive pixilated image data that can be analyzed to locate individual sites in the flow cell and to determine the type of nucleotide that was most recently attached or bound to each site. Other suitable imaging techniques may also be employed, such as techniques in which one or more points of radiation are scanned along the sample or techniques employing "step and shoot" imaging approaches. The optical detection system 26 and the stage 22 may cooperate to maintain the flow cell and detection system in a static relationship while obtaining an area image, or, as noted, the flow cell may be scanned in any suitable mode (e.g., point scanning, line scanning, "step-and-shoot" scanning).

While many different technologies may be used for imaging, or more generally for detecting the molecules at the sites, presently contemplated implementations may make use of confocal optical imaging at wavelengths that cause excitation of fluorescent tags. The tags, excited by virtue of their absorption spectrum, return fluorescent signals by virtue of their emission spectrum. The optical detection system 26 is configured to capture such signals, to process pixelated image data at a resolution that allows for analysis of the signal-emitting sites, and to process and store the resulting image data (or data derived from it).

In a sequencing operation, cyclic operations or processes are implemented in an automated or semi-automated fashion in which reactions are promoted, such as with single nucleotides or with oligonucleotides, followed by flushing, imaging and de-blocking in preparation for a subsequent cycle. The sample library, prepared for sequencing and immobilized on the flow cell, may undergo a number of such cycles before all useful information is extracted from the library. The optical detection system may generate image data from scans of the flow cell (and its sites) during each cycle of the sequencing operation by use of electronic detection circuits (e.g., cameras or imaging electronic circuits or chips). The resulting image data may then be analyzed to locate individual sites in the image data, and to analyze and characterize the molecules present at the sites, such as by reference to a specific color or wavelength of light (a characteristic emission spectrum of a particular fluorescent tag) that is detected at a specific location, as indicated by a group or cluster of pixels in the image data at the location. In a DNA or RNA sequencing application, for example, the four common nucleotides may be represented by distinguishable fluorescence emission spectra (wavelengths or wavelength ranges of light). Each emission spectrum, then, may be assigned a value corresponding to that nucleotide. Based upon this analysis, and tracking the cyclical values determined for each site, individual nucleotides and their orders may be determined for each site. These sequences may then be further processed to assemble longer segments including genes, chromosomes, and so forth. As used in this disclosure the terms "automated" and "semi-automated" mean that the operations are performed by system programming or configuration with little or no human interaction once the operations are initiated, or once processes including the operations are initiated.

In the illustrated implementation, reagents 30 are drawn or aspirated into the flow cell through valving 32. The valving may access the reagents from recipients or vessels in which they are stored, such as through pipettes or sippers (not shown in FIG. 1). The valving 32 may allow for selection of the reagents based upon a prescribed sequence of operations performed. The valving may further receive commands for directing the reagents through flow paths 34 into the flow cell 20. Exit or effluent flow paths 36 direct the used reagents from the flow cell. In the illustrated implementation, a pump 38 serves to move the reagents through the system. The pump may also serve other useful functions, such as measuring reagents or other fluids through the system, aspirating air or other fluids, and so forth, as discussed in greater detail below. Additional valving 40 downstream of pump 38 allows for appropriately directing the used reagent to disposal vessels or recipients 42.

The instrument further includes a range of circuitry that aids in commanding the operation of the various system components, monitoring their operation by feedback from sensors, collecting image data, and at least partially processing the image data. In the implementation illustrated in FIG. 1, a control/supervisory system 44 includes a control system 46 and a data acquisition and analysis system 48. Both systems will include one or more processors (e.g., digital processing circuits, such as microprocessors, multi-core processors, FPGA's, or any other suitable processing circuitry) and associated memory circuitry 50 (e.g., solid state memory devices, dynamic memory devices, on and/or offboard memory devices, and so forth) that may store machine-executable instructions for controlling, for example, one or more computers, processors, or other similar logical devices to provide certain functionality. Application-specific or general purpose computers may at least partially make up the control system and the data acquisition and analysis system. The control system may include, for example, circuitry configured (e.g., programmed) to process commands for fluidics, optics, stage control, and any other useful functions of the instrument. The data acquisition and analysis system 48 interfaces with the optical detection system to command movement of the optical detection system or the stage, or both, the emission of light for cyclic detection, receiving and processing of returned signals, and so forth. The instrument may also include various interfaces as indicated at reference 52, such as an operator interface that permits control and monitoring of the instrument, loading of samples, launching of automated or semi-automated sequencing operations, generation of reports, and so forth. Finally, in the implementation of FIG. 1, external networks or systems 54 maybe coupled to and cooperate with the instrument, for example, for analysis, control, monitoring, servicing, and other operations.

It may be noted that while a single flow cell and fluidics path, and a single optical detection system are illustrated in FIG. 1, in some instruments more than one flow cell and fluidics path may be accommodated. For example, in a presently contemplated implementation, two such arrangements are provided to enhance sequencing and throughput. In practice, any number of flow cells and paths may be provided. These may make use of the same or different reagent receptacles, disposal receptacles, control systems, image analysis systems, and so forth. Where provided, the multiple fluidics systems may be individually controlled or controlled in a coordinated fashion. It is to be understood that the phrase "fluidically connected" may be used herein to describe connections between two or more components that place such components in fluidic communication with one another, much in the same manner that "electrically connected" may be used to describe an electrical connection between two or more components. The phrase "fluidically interposed" may be used, for example, to describe a particular ordering of components. For example, if component B is fluidically interposed between components A and C, then fluid flowing from component A to component C would flow through component B before reaching component C.

Figure 2:
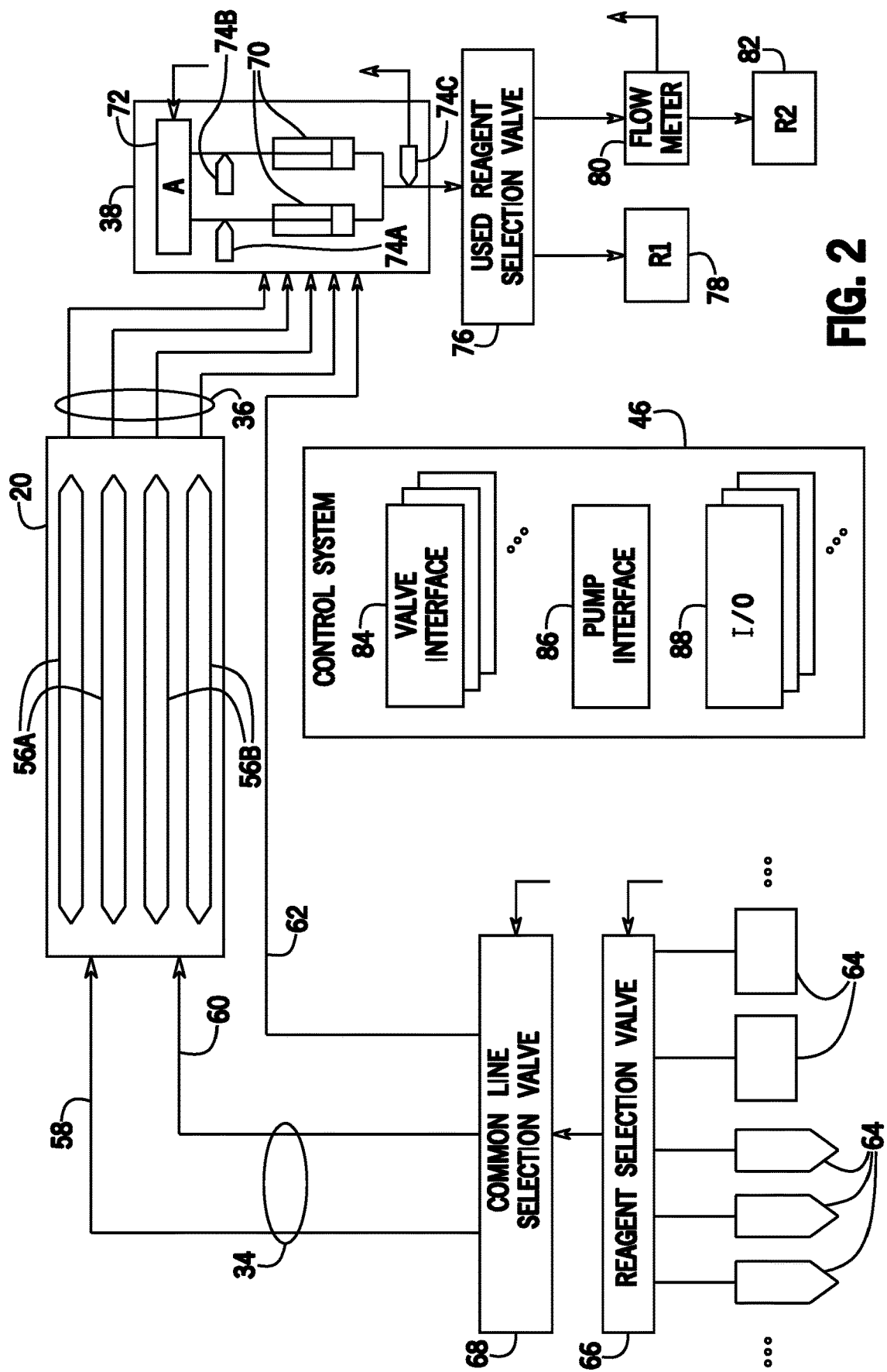
FIG. 2 is a diagrammatical overview of an example fluidic system of the sequencing system of FIG. 1.

FIG. 2 illustrates an example fluidic system of the sequencing system of FIG. 1. In the implementation illustrated, the flow cell/array 20 includes a series of pathways or lanes 56A and 56B which may be grouped in pairs for receiving fluid substances (e.g., reagents, buffers, reaction media) during sequencing operations. The lanes 56A are coupled to a common line 58 (a first common line), while the lanes 56B are coupled to a second common line 60. A bypass line 62 is also provided to allow fluids to bypass the flow cell without entering it. As noted above, a series of vessels or recipients 64 allow for the storage of reagents and other fluids that may be utilized during the sequencing operation. A reagent selection valve 66 is mechanically coupled to a motor or actuator (not shown) to allow selection of one or more of the reagents to be introduced into the flow cell. Selected reagents are then advanced to a common line selection valve 68 (also referred to as a selector valve) which similarly includes a motor (not shown). The common line selection valve may be commanded (e.g., signaled, instructed) to select one or more of the common lines 58 and 60, or both common lines, to cause the reagents 64 to flow to the lanes 56A and/or 56B in a controlled fashion, or the bypass line 62 to flow one or more of the reagents between the common line selection valve 68 and the pump 38.

Used reagents exit the flow cell through lines (e.g., exit or effluent flow paths 36) coupled between the flow cell/array 20 and the pump 38. In the illustrated implementation, the pump includes a syringe pump having a pair of syringes 70 that are controlled and moved by an actuator 72 to aspirate the reagents and other fluids and to expel the reagents and fluids during different operations of the testing, verification and sequencing cycles. The pump assembly may include various other parts and components, including valving, instrumentation, actuators, and so forth (not shown). In the illustrated implementation, pressure sensors 74A and 74B sense pressure on inlet lines of the pump, while a pressure sensor 74C is provided to sense pressures output by the syringe pump.

Fluids used by the system enter a used reagent selection valve 76 from the pump. This valve allows for selection of one of multiple flow paths for used reagents and other fluids. In the illustrated implementation, a first flow path leads to a first used reagent receptacle 78, while a second flow path leads through a flow meter 80 a second used reagent receptacle 82. Depending upon the reagents used, it may be advantageous to collect the reagents, or certain of the reagents in separate vessels for disposal, and the used reagent selection valve 76 allows for such control.

It should be noted that valving within the pump assembly may allow for various fluids, including reagents, solvents, cleaners, air, and so forth to be aspirated by the pump and injected or circulated through one or more of the common lines, the bypass line, and the flow cell. Moreover, as noted above, in a presently contemplated implementation, two parallel implementations of the fluidics system shown in FIG. 2 are provided under common control. Each of the fluidics systems may be part of a single sequencing instrument, and may carry out functions including sequencing operations on different flow cells and sample libraries in parallel.

The fluidics system operates under the command of control system 46 which implements prescribed protocols for testing, verification, sequencing, and so forth. The prescribed protocols will be established in advance and include a series of events or operations for activities such as aspirating reagents, aspirating air, aspirating other fluids, expelling such reagents, air and fluids, and so forth. The protocols will allow for coordination of such fluidic operations with other operations of the instrument, such as reactions occurring in the flow cell, imaging of the flow cell and its sites, and so forth. In the illustrated implementation, the control system 46 employs one or more valve interfaces 84 which are configured to provide command signals for the valves, as well as a pump interface 86 configured to command operation of the pump actuator. Various input/output circuits 88 may also be provided for receiving feedback and processing such feedback, such as from the pressure sensors 74A-C and flow meter 80.

Figure 3:
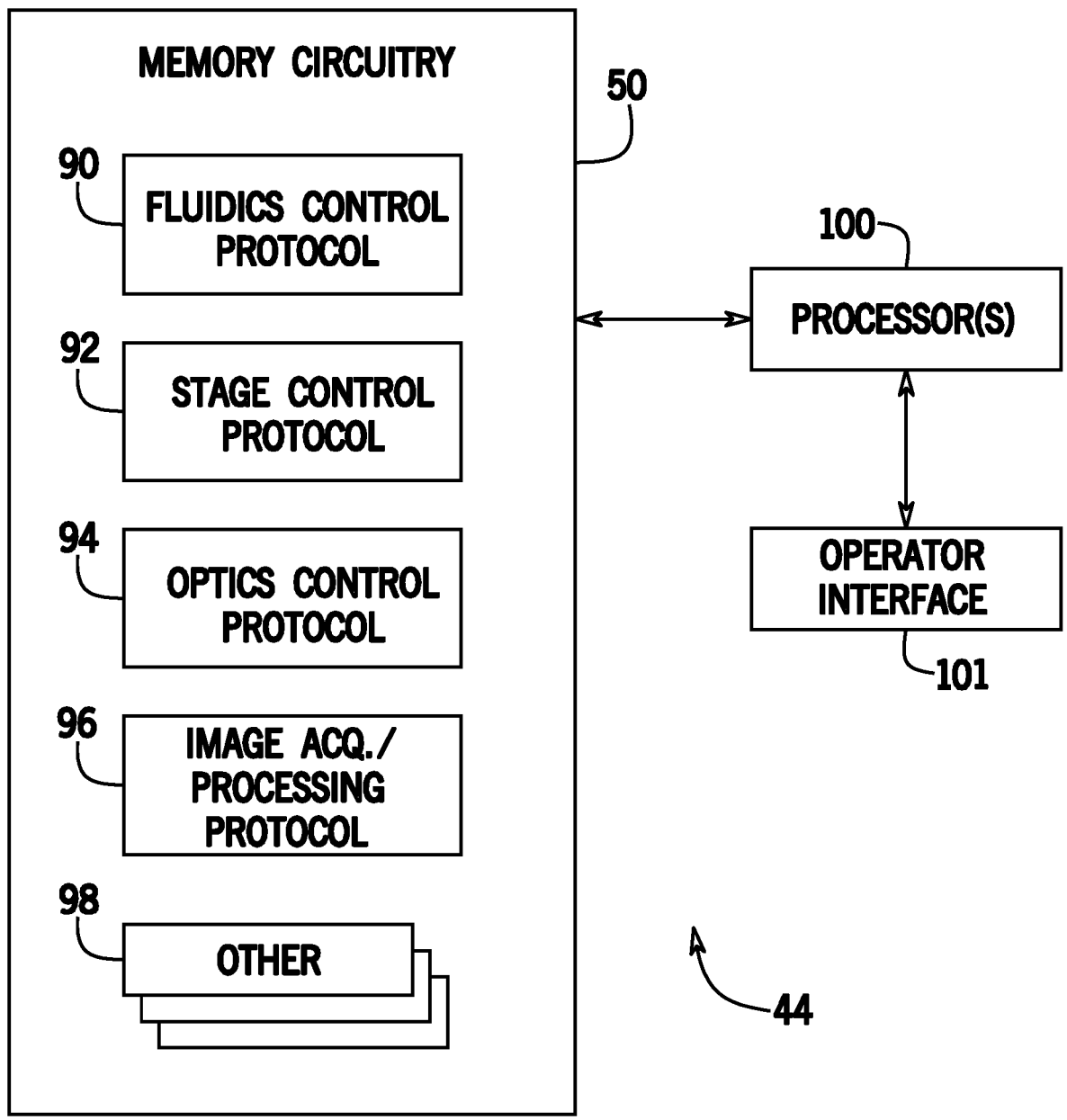
FIG. 3 is a diagrammatical overview of an example of processing and control system of the sequencing system of FIG. 1.

FIG. 3 illustrates certain of the functional components of the control/supervisory system 44. As illustrated, the memory circuitry 50 stores prescribed routines that are executed during testing, commissioning, troubleshooting, servicing, and sequencing operations. Many such protocols and routines may be implemented and stored in the memory circuitry, and these may be updated or altered from time to time. As illustrated in FIG. 3, these may include a fluidics control protocol 90 for controlling the various valves, pumps, and any other fluidics actuators, as well as for receiving and processing feedback from fluidics sensors, such as valves, and flow and pressure sensors. A stage control protocol 92 allows for moving the flow cell as desired, such as during imaging. An optics control protocol 94 allows for commands to be issued to the imaging components to illuminate portions of the flow cell and to receive returned signals for processing. An image acquisition and processing protocol 96 allows for the image data to be at least partially processed for extraction of useful data for sequencing. Other protocols and routines may be provided in the same or different memory circuitry as indicated by reference 98. In practice, the memory circuitry may be provided as one or more memory devices, such as both volatile and non-volatile memories. This memory may be within the instrument, and some may be off-board.

One or more processors 100 access the stored protocols and implement them on the instrument. As noted above, the processing circuitry may be part of application-specific computers, general-purpose computers, or any suitable hardware, firmware and software platform. The processors and the operation of the instrument may be commanded by human operators via an operator interface 101. The operator interface may allow for testing, commissioning, troubleshooting, and servicing, as well as for reporting any issues that may arise in the instrument. The operator interface may also allow for launching and monitoring sequencing operations.

The fluidics control protocol 90 stored in the memory 50 may also include diagnostic routines that can be executed by the processor 100 to evaluate the integrity and reliability of the fluidic system. With this in mind, present implementations are directed toward methods of operating the fluidics system of the instrument 12 to isolate and test various flow paths (e.g., flow cell channels, common lines, and pump lines) of the fluidic system for potential leaks using pressurized air to determine whether each of the flow paths maintains pressure in a desired manner. Using these diagnostic routines, an operator may evaluate the fluidic system routinely (e.g., before each use of the instrument, at the beginning of each day or shift, on weekly or monthly intervals) or at will, based on a particular concern. Accordingly, present implementations enable the early detection and diagnosis of potential fluid leaks. As such, the presently disclosed diagnostic routines can help to avoid sample loss, data loss, and damage to sensitive components of the instrument 12, which can result from a fluid leak during operation of the instrument 12.

Figure 4:
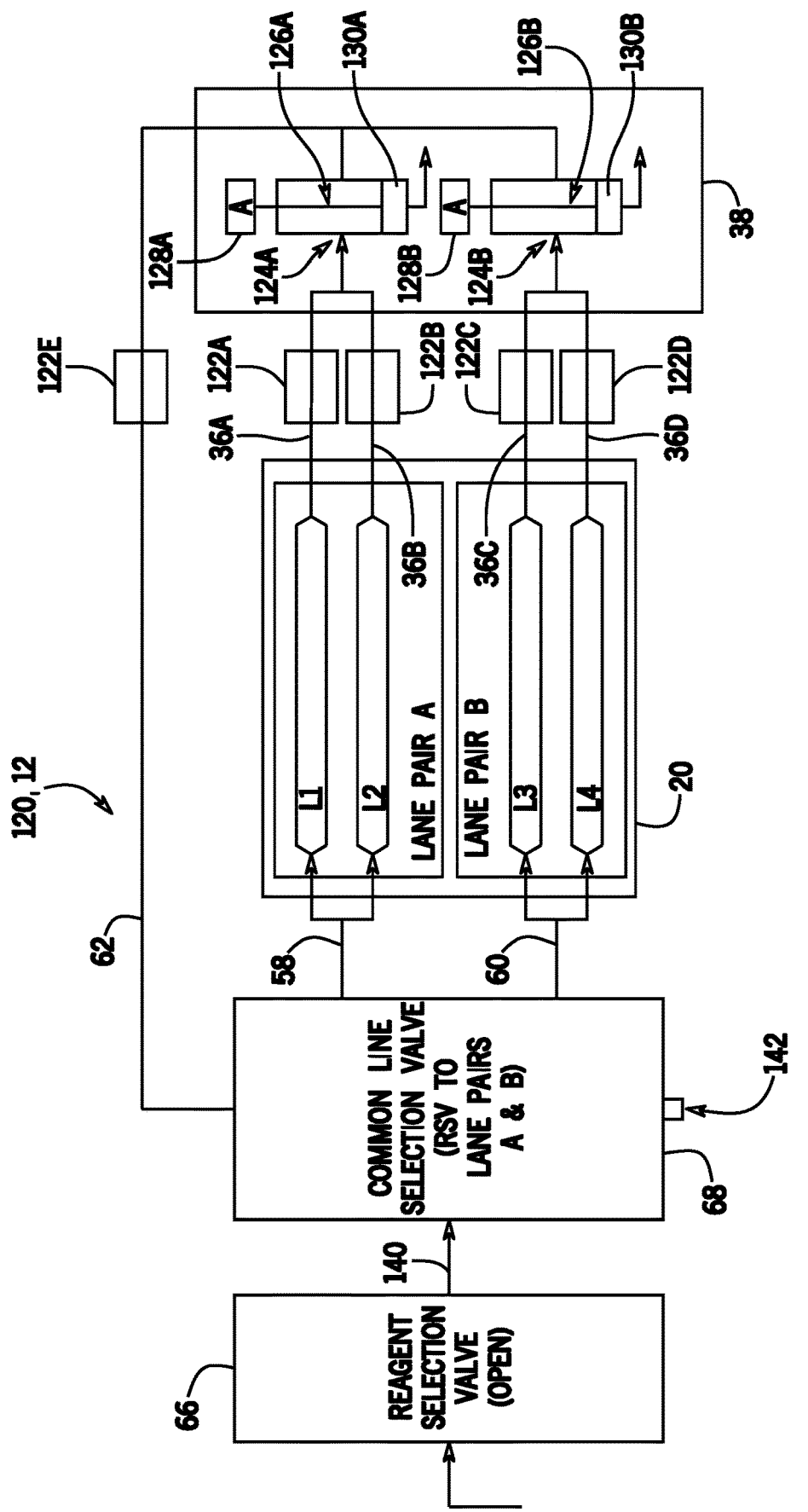
FIG. 4 is a diagrammatical overview of another implementation of a portion of a fluidic system for the example sequencing system of FIG. 1.

FIG. 4 illustrates a portion of the fluidic system 120 for an implementation of the instrument 12, wherein the arrows are indicative of the flow of substances (e.g., reagents, buffers, analytes) through the various illustrated flow paths during sample analysis. For the implementation illustrated in FIG. 4, a flow cell array 20 includes two lane pairs, denoted as lane pair A and lane pair B. Each of the two lane pairs includes two respective fluidic channels or lanes, denoted as lanes L1, L2, L3, and L4 in FIG. 4. For the illustrated implementation, the flow cell array 20 is designed to be operated as illustrated in FIG. 4, with both lane pairs A and B present in the flow cell 20, or with a single lane pair (e.g., lane pairs A or B) present in the flow cell 20, as discussed in greater detail below with respect to FIGS. 12-14. Further, the fluidic system 120 illustrated in FIG. 4 includes a number of inline pressure sensors 122 (e.g., pressure sensors 122A-122E, pressure sensors 74A-C of FIG. 2) that are respectively coupled the effluent lines 36A, 36B, 36C, and 36D and the bypass line 62. These inline pressure sensors 122 are communicatively coupled (e.g., via a wired or wireless communication channel) to the processor 100 of the control system 46 and configured to output electronic signals to the processor 100 corresponding to the pressure of fluids in the various flow paths of the fluidic system 120.

Figure 5A:
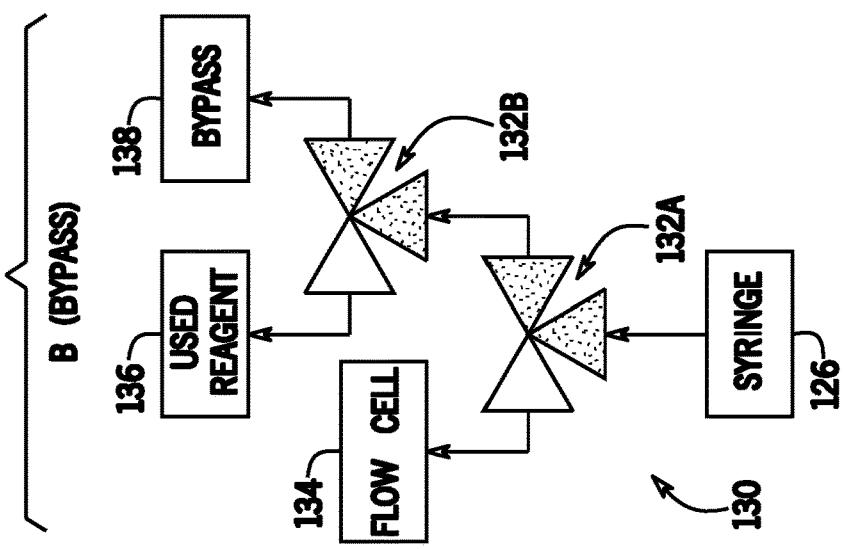
FIGS. 5A-C are diagrams illustrating flow paths through the valving for an example syringe pump of the example fluidic system of FIG. 4 in various positions.
Figure 5B:
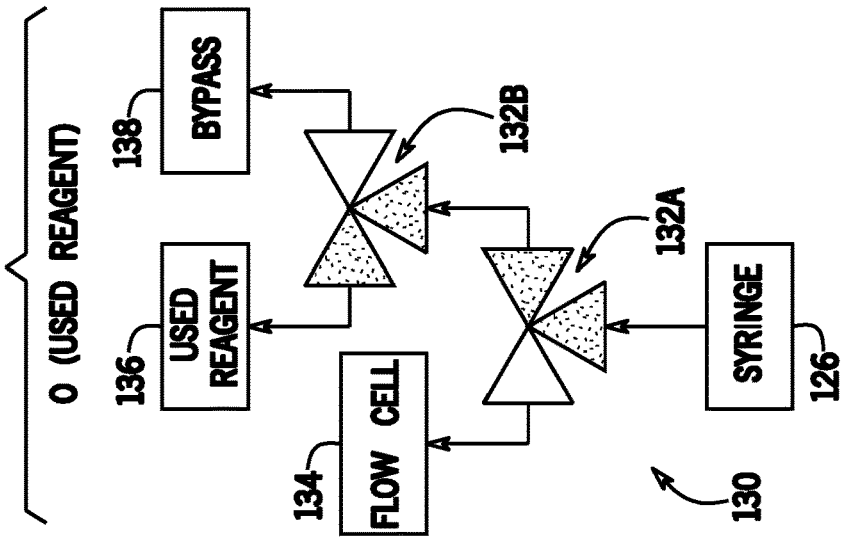
Figure 5C:
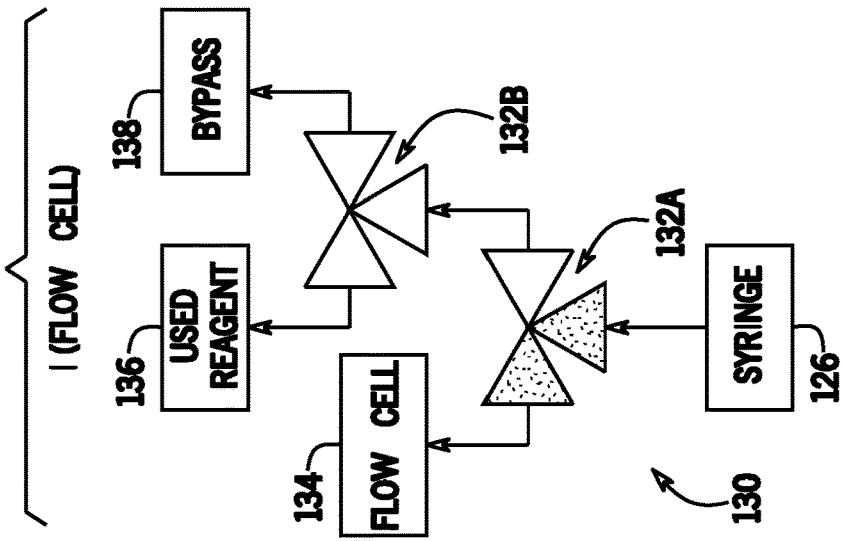

Additionally, the pump 38 of the fluidic system illustrated in FIG. 4 includes multiple syringe pumps 124 (e.g., syringe pumps 124A and 124B). As illustrated, the syringe pumps 124 each include one or more respective syringes 126 (e.g., syringes 126A and 126B) that are respectively actuated by actuators 128 (e.g., actuators 128A and 128B). The illustrated syringe pumps 124 also include valving 130 (e.g., valving 130A and 130B), which enable the syringe pumps to push or pull fluids into and out of different orifices or ports of the pumps 124. For example, FIGS. 5A, 5B, and 5C are diagrams illustrating flow paths through the valving 130 (e.g., valving 130A and 130B) of FIG. 4 in different positions. As illustrated, the valving 130 includes two valve units 132A and 132B (e.g., solenoid valves or other controllable valves) that, as the syringe 126 is actuated, cooperate to aspirate a volume of fluids or dispense a volume of fluid into a flow cell port 134 leading to the flow cell array 20, a used reagent port 136 leading to the used reagent collection system, or a bypass port 138 leading to the bypass line 62. In FIG. 5A, referred to hereafter as the "I" position, the valve units 132A and 132B enable the syringe 126 to draw fluid from, or introduce fluid into, the flow cell port 134. In FIG. 5B, referred to hereafter as the "O" position, the valve units 132A and 132B enable the syringe 126 to draw fluid from or introduce fluid into, the used reagent port 136. In FIG. 5C, referred to hereafter as the "B" position, the valve units 132A and 132B enable the syringe 126 draw fluid from or introduce fluid into the bypass port 138. As generally discussed above, the control system 46 sends control signals to control the actuation of the actuators 126 and the valving 130. In certain implementations, the syringe pumps 124, including the associated valving, may be rated for pressures up to about 22 pounds per square inch gauge (psig); however, in other implementations, other pressures may be used in accordance with the present disclosure.

The common line selection valve 68 of the implementation illustrated in FIG. 4 enables fluid coupling of a reagent flow path 140 (disposed between the reagent selector valve (RSV) 66 and the common line selection valve 66), the first common line 58, the second common line 60, the bypass line 62, and an air inlet 142, in various manners. For example, FIGS. 6A-F illustrate a cross-sectional diagrammatical view of the implementation of the common line selection valve 68 illustrated in FIG. 4 in various positions or orientations. Different shading or hashing is used to distinguish between the ports 150 of the common line selection valve 68, which include: a bypass port 150A that is fluidically coupled to the bypass line 62, an air port 150B that is fluidically coupled to the air inlet 142, a lane pair A port 150C that is fluidically coupled to the first common line 58 leading to lane pair A, an RSV port 150D that is fluidically coupled to the reagent selector valve 66 via the reagent flow path 140, and a lane pair B port 150E that is fluidically coupled to the second common line 60 leading to lane pair B.

The common line selection valve 68 illustrated in FIGS. 6A-F has a rounded, central portion 152 that rotates about a central point 154 and that includes various channels 156. The central portion 152 is firmly sealed against ports 150 such that fluid does not leave a port 150 unless a channel 156 is suitably aligned to enable flow to another port 150. For example, the orientation of the common line selection valve 68 illustrated in FIG. 6A, referred to hereafter as the "RSV to Lane Pair A" position, fluidically couples the RSV port 150D to the bypass port 150A. The orientation illustrated in FIG. 6B, referred to hereafter as the "RSV to Lane Pair B" position, fluidically couples the RSV port 150D to the lane pair B port 150E. The orientation illustrated in FIG. 6C, referred to hereafter as the "RSV to Lane Pairs A & B" position, fluidically couples the RSV port 150D to the to both the lane pair A port 150C and the lane pair B port 150E. As such, the orientations illustrated in FIGS. 6A-C enable the implementation of the fluidic system 120 illustrated in FIG. 4 to operate, as described above, to direct fluids received from the reagent selection valve 66 through a single lane pair (e.g., lane pairs A or B) or both lane pairs A and B simultaneously.

The orientations of the common line selection valve 68 illustrated in FIGS. 6A-F, as well as other potential positions, may also be useful for diagnostic purposes to enable the processor 100 to isolate, prepare, and pressure test the various flow paths of the fluidic system. In particular, the orientation illustrated in FIG. 6D, referred to hereafter as the "Air to Lane Pairs A & B" position, fluidically couples the air port 150B to both lane pair A port 150C and lane pair B port 150E, which is useful to dry the flow cell 20 prior to pressure testing, as discussed below. The orientation illustrated in FIG. 6E, referred to hereafter as the "Air to Bypass" position, fluidically couples air port 150B to the bypass port 150A, which is useful to enable air to be introduced into the fluidic system during certain pressure tests, as discussed below. The orientation illustrated in FIG. 6F, referred to hereafter as the "RSV to Bypass" position, fluidically couples the RSV port 150D to the bypass port 150A, which is useful during pressure testing of the bypass line 62, as discussed below.

Figure 7:
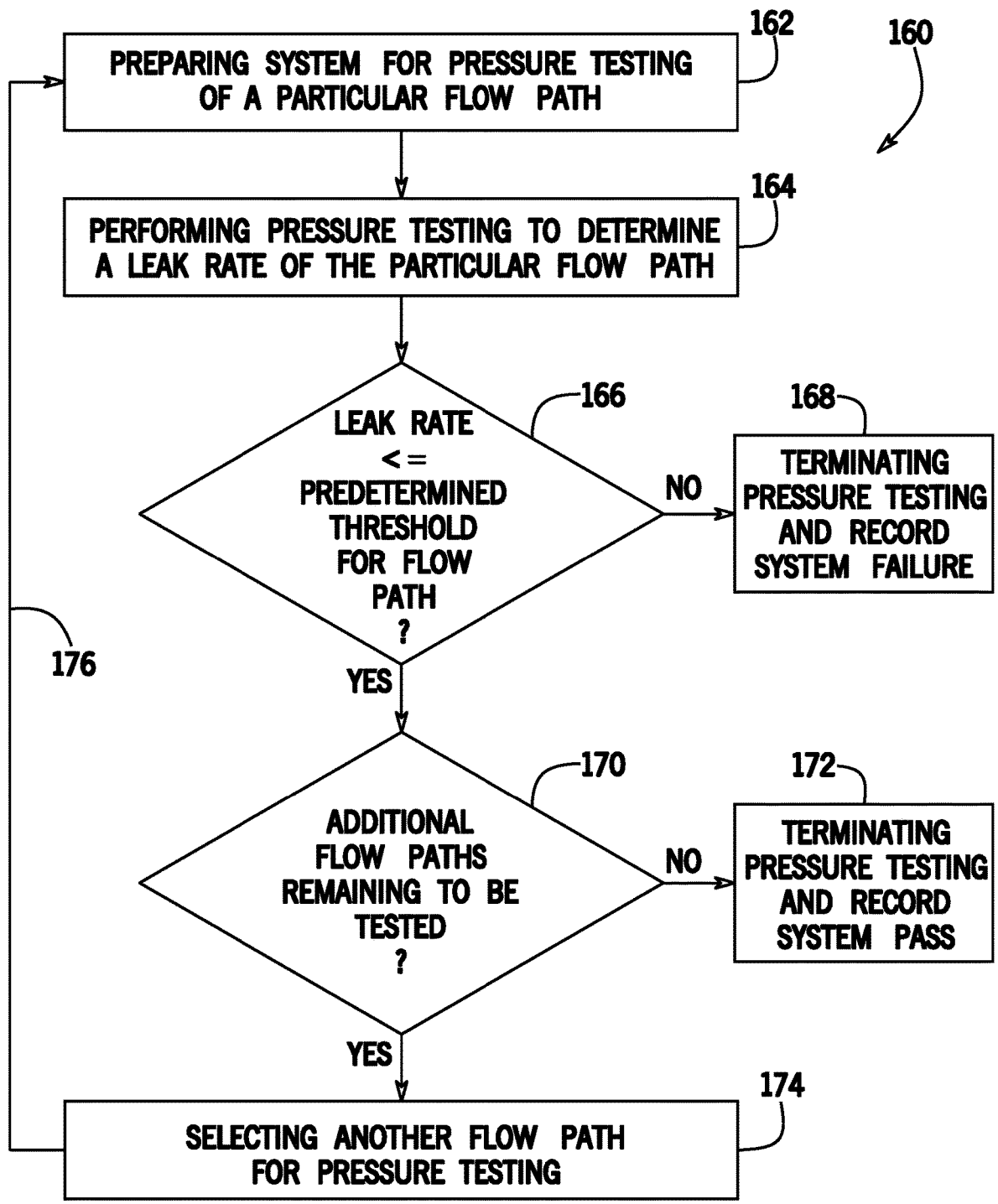
FIG. 7 is a flow diagram illustrating an implementation of an example process for pressure testing the fluidic system of FIG. 4.

As mentioned, the fluidics control protocol 90 stored in the memory 50 may include diagnostic routines that can be executed by the processor 100 to evaluate the fluidic system 120 for potential leaks. FIG. 7 is a flow diagram representing an implementation of a process 160 for pressure testing the fluidic system 120 of the instrument 12 illustrated in FIG. 4. The illustrated process 160 begins with preparing system for pressure testing of a particular flow path (block 162). While discussed in detail below with respect to FIG. 8, in block 162, processor 100 may isolate and prepare the particular flow path of the fluidic system 120, as well as otherwise ensure that the instrument 12 is ready to begin pressure testing. Once preparation is successfully completed, the processor 100 may perform pressure testing to determine a leak rate of the particular flow path (block 164). While discussed in detail below with respect to FIG. 9, in block 164, processor 100 may pressurize the particular flow path of the fluidic system 120 to a target pressure, measure a change in pressure over a known period of time, and determine a leak rate based on the measured change in pressure.

Continuing through the process 160 illustrated in FIG. 7, the processor 100 may then determine whether the leak rate is less than or equal to a predetermined threshold value (block 166). If the determined leak rate is greater than the predetermined threshold value, the processor 100 may terminate further pressure testing and record details regarding the failure (block 168). In certain implementations, the predetermined threshold value for the leak rate may be calculated based, at least in part, on the volume of the particular flow path being tested and the viscosity of the fluids that traverse the fluidic system during operation (e.g., reagents, buffers, analytes) relative to the viscosity of air. For example, if a leak rate of the fluids that traverse the fluidic system during operation should be maintained at or below approximately 8 microliters per minute (μL/min) for a four-lane configuration of the fluidic system 120, as illustrated in FIG. 4, based on the difference between the viscosity of the fluids that traverse the fluidic system during operation (e.g., reagents, buffers, analytes) and air, the predetermined threshold value may be approximately 0.02 pounds per square inch per second (psi/sec). By further example, if a leak rate of the fluids that traverse the fluidic system during operation should be maintained at or below approximately 4 microliters per minute (μL/min) for a two-lane configuration with only one lane pair A or B loaded (approximately half the volume of the four-lane configuration), based on the viscosity difference, the predetermined threshold value may again be approximately 0.02 psi/sec.

If the determined leak rate is less than or equal to the predetermined threshold value, the processor 100 may determine whether additional pressure tests of other flow paths should be performed (block 170). If no further pressure testing is to be performed, then the processor 100 may terminate pressure testing and record details regarding the successful pressure testing (block 172). If additional pressure testing is to be performed, the processor 100 may select the next flow path to be tested (block 174), and then the actions set forth in blocks 162, 164, 166, and 170 may be repeated, as indicated by the arrow 176. In certain implementations, the processor 100 may prompt the operator to perform one or more physical operations (e.g., load a lane pair, remove a lane pair, remove/load multiple lane pairs, e.g., where multiple lane pairs are in a single flow cell cartridge) to enable a particular flow path to be tested.

Figure 8:
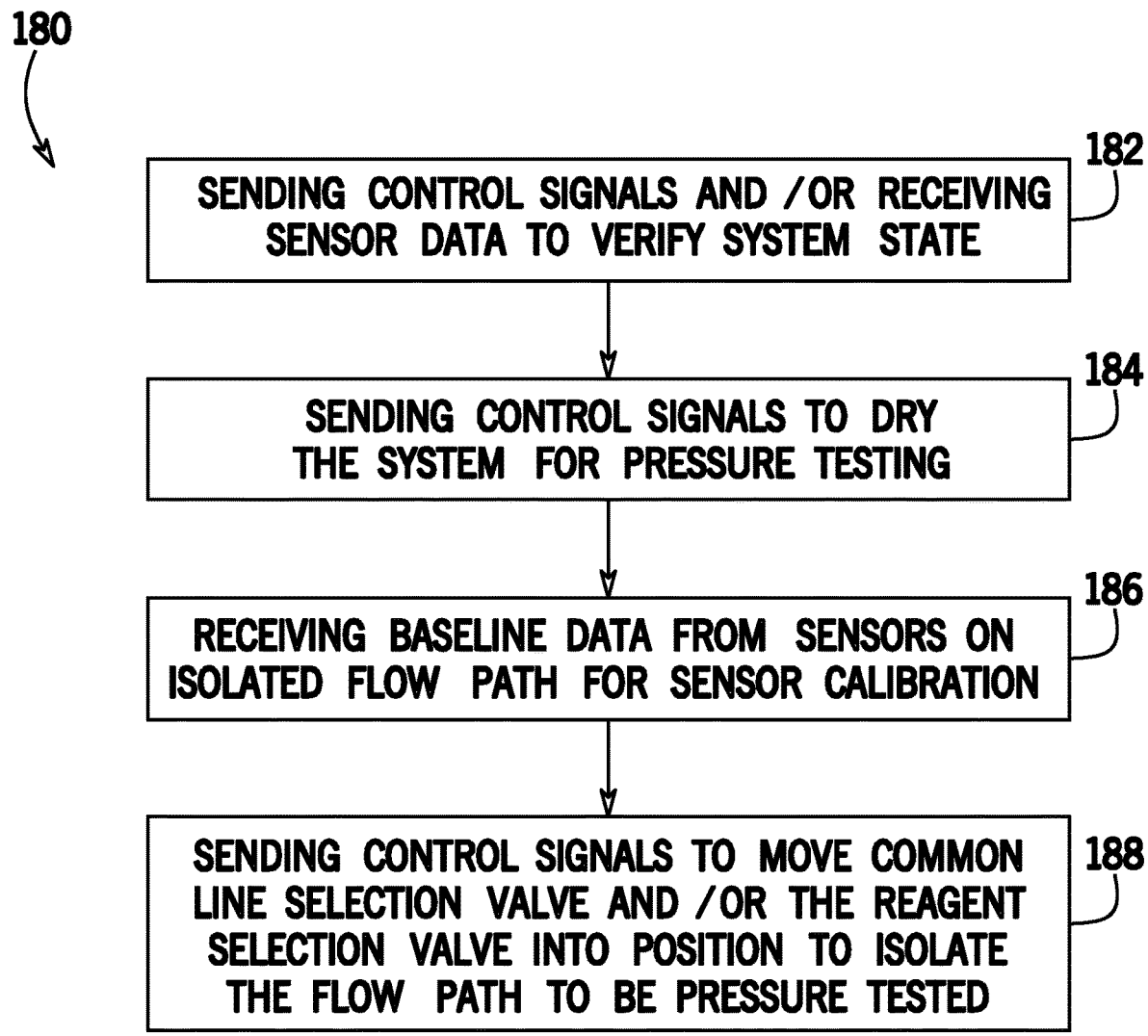
FIG. 8 is a flow diagram illustrating an implementation of an example process to prepare the fluidic system of FIG. 4 for pressure testing.

FIG. 8 is a flow diagram illustrating an implementation of a process 180 for preparing the fluidic system 120 for pressure testing, corresponding to block 162 of FIG. 7. The illustrated process 180 begins with sending control signals and/or receiving sensor data to verify the state of the system (block 182). This may include, for example, ensuring that the appropriate number of lane pairs are present in the flow cell 20. In certain implementations, as illustrated, the process 184 may include the processor 100 sending control signals to the fluidic system 120 to dry the system before pressure testing (block 184). For example, as mentioned above with respect to FIG. 6D, the processor 100 may provide appropriate control signals to orient the common line selection value 68 in the "Air to Lane Pairs A & B" position and the reagent selection valve 66 in a blocked or closed position, while actuating the pump 38 to draw and remove liquid from the flow paths of the fluidic system, thereby drawing air into the system through the air inlet 142.

The process 180 illustrated in FIG. 8 continues with the processor 100 receiving baseline data from sensors on an isolated flow path for sensor calibration (block 186). For example, unless already in the correct position, the processor 100 may first provide suitable control signals to the common line selection valve 68 to fluidically couple the flow path to be pressure tested, or the entire fluidic system 120, to the air inlet 142 and equalize the pressure in the flow path with ambient atmospheric pressure. For example, the common line selection valve 68 may be disposed in the "Air to Lane Pairs A & B" position, illustrated in FIG. 6D, when the flow path to be tested includes a lane pair, and may be disposed in the "Air to Bypass" position, illustrated in FIG. 6E, when the flow path to be tested includes the bypass line 62. After fluidically coupling the flow path to be pressure tested to the air inlet, one or more pressure sensors 122A-122E of the fluidic system 120, as illustrated in FIG. 4, may be used to measure a baseline pressure (e.g., ambient pressure) for calibration.

Returning to FIG. 8, the illustrated process 180 concludes with the processor 100 sending control signals to appropriately orient the common line selection valve 68 and/or the regent selection valve 66 to isolate the flow path to be pressure tested (block 180). As discussed above with respect to FIG. 6A-F, the common line selection valve 68 may be oriented in a number of different positions to selectively fluidically couple, and selectively isolate, the various flow paths of the fluidic system 120. The isolation set forth in block 188 is discussed in further detail below with respect to FIGS. 11-14.

Figure 9:
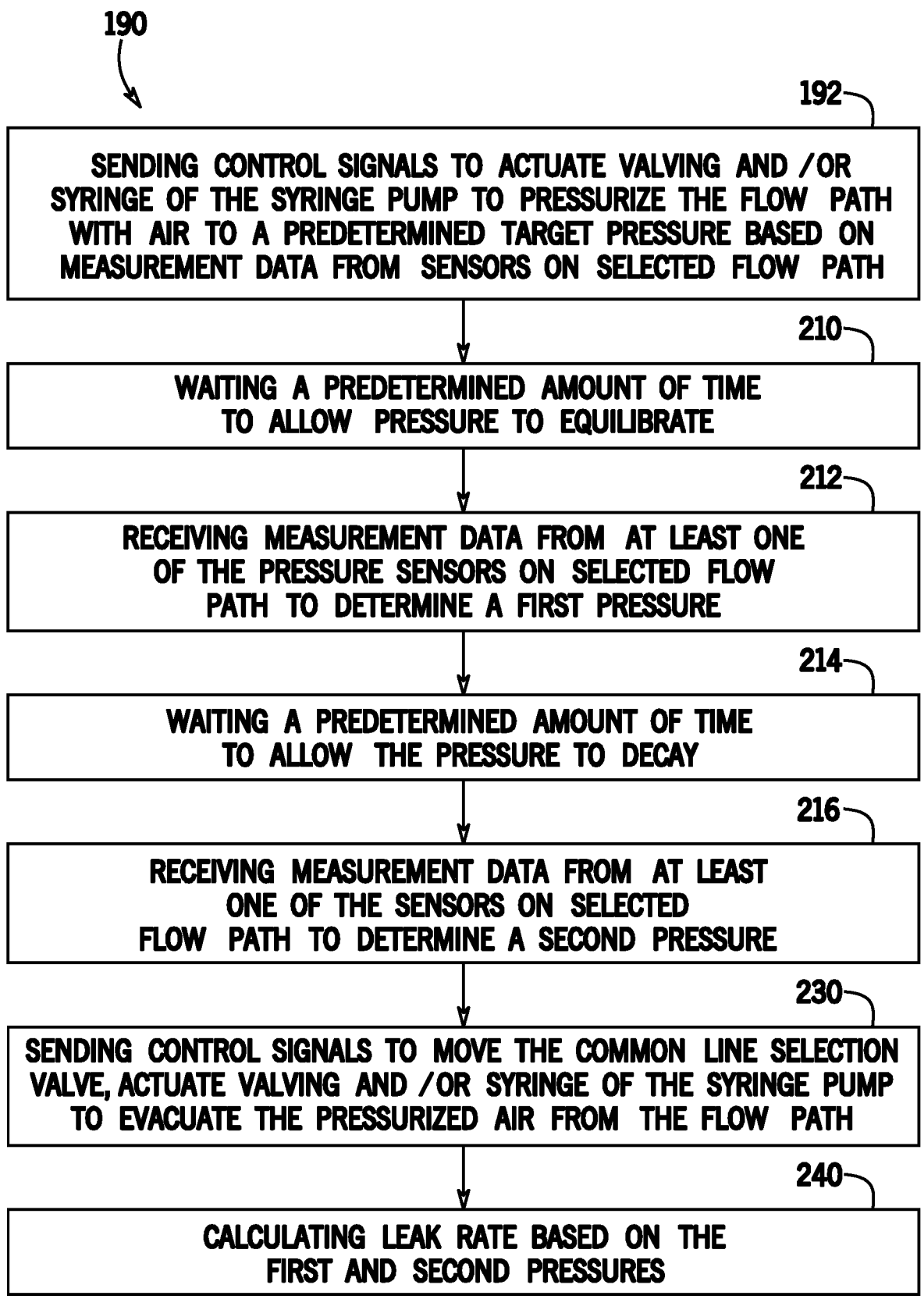
FIG. 9 is a flow diagram illustrating an implementation of an example process for performing pressure testing to determine a leak rate of the particular flow path of the fluidic system of FIG. 4.

FIG. 9 is a flow diagram illustrating an implementation of a process 190 for performing pressure testing to determine a leak rate of the particular flow path of the fluidic system 120, corresponding to block 164 of FIG. 7. The illustrated process 190 begins with the processor 100 sending control signals to actuate one or more portions of the pump 38 (e.g., valving 130 and/or syringes 126 of at least one of the syringe pumps 124) to pressurize the flow path being pressure tested with air to a predetermined target pressure (block 192). It may be appreciated that the target pressure may correspond to a pressure that the fluidic system 120 experiences during normal operation, or may correspond to a pressure that is greater than (e.g., two times, three times, etc.) the pressure that the fluidic system 120 experiences during normal operation. For example, in an implementation, if the fluidic system 120 experiences approximately 9 psig of pressure during sample analysis, then, in certain implementations, the target pressure for pressure testing may be approximately 18 psig to provide a more intensive pressure test of the flow path.

As discussed in greater detail below, for pressure testing different configurations of the fluidic system 10, a particular syringe pump 124 (e.g., syringe pump 124A or 124B) may be used to pressurize the flow path. In other implementations, both syringe pumps may cooperate to pressurize the flow path being tested. Additionally, the processor 100 may determine the current pressure within the flow path based on pressure measurements received from pressure sensors 122. In cases in which the flow path being pressure tested includes multiple pressure sensors 122, the processor 100 may use pressure measurements from a particular pressure sensor, for example, to compare the measurements from multiple pressure sensors to verify operation of the pressure sensors.

Figure 10:
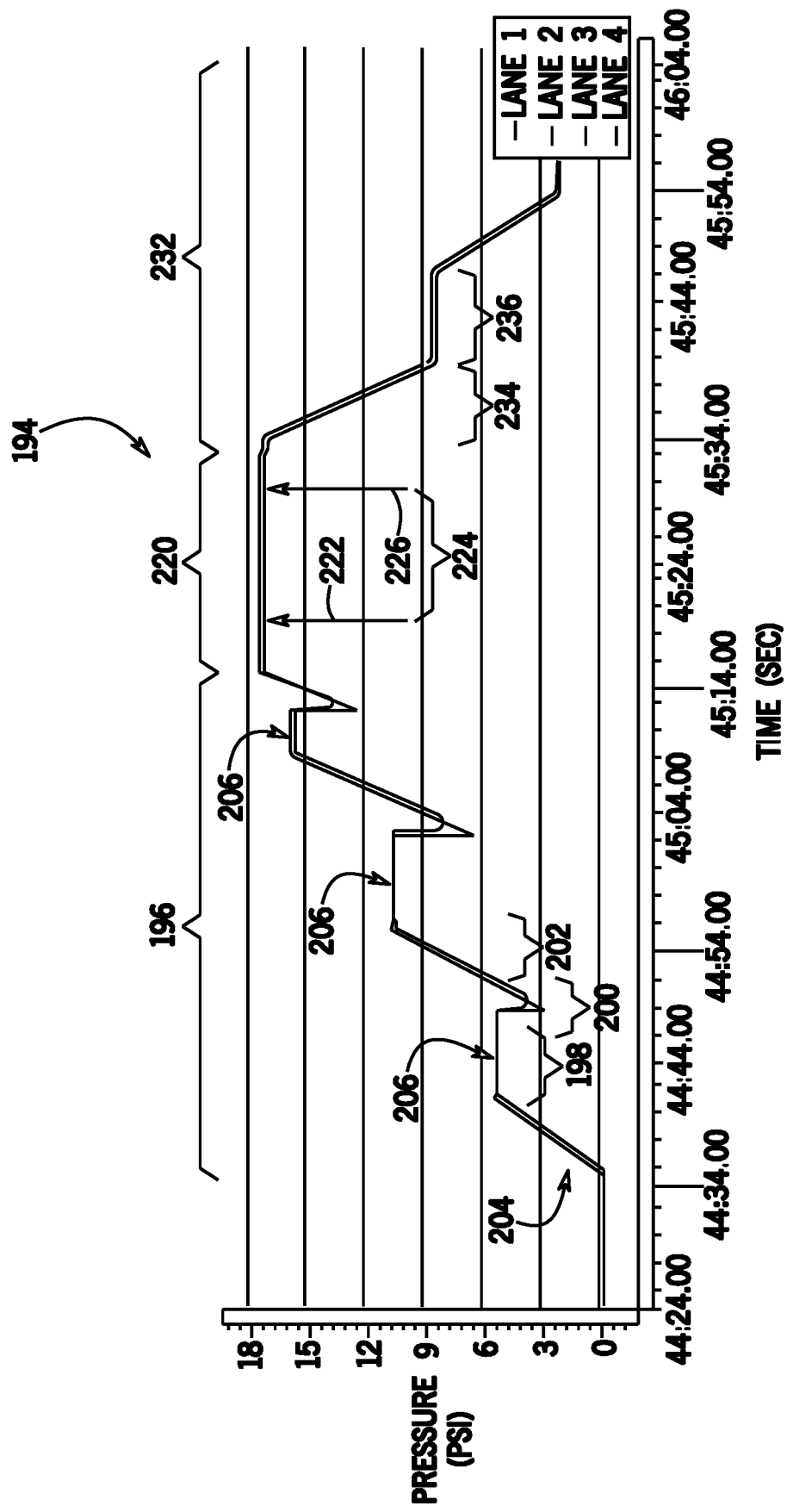
FIG. 10 is a graph illustrating an example of pressure in a flow path of the fluidic system of FIG. 4 as a function of time during pressure testing, as set forth in FIG. 9.

Further, while other implementations may include a different pumping mechanism, the syringe pumps 124 of the implementation of the fluidic system 120 illustrated in FIG. 4 generally increase the pressure in the flow path being tested in discrete pressure steps. For example, FIG. 10 is a graph 194 illustrating pressure (psi) for lanes L1-L4 as respectively measured by the pressure sensors 122A-122D in a flow path of the fluidic system 10 of the instrument 12 as a function of time (sec) during the pressure testing described by the method 190 of FIG. 9. The pressurization set forth in block 192 of FIG. 9 is denoted by the pre-measurement region 196 of the graph 194 of FIG. 10. More specifically, the region 196 includes repeated cycles during which, first, pressure in the flow path is relatively constant as air is aspirated into the syringe 126 from the atmosphere, as indicated in the region 198. The valving is then actuated to cause the syringe 126 to be fluidically connected with the flow path. Then, pressure in the flow path equilibrates as pressurized air in the flow path mixes with lower-pressure air in the syringe, as indicated in the region 200. Subsequently, pressure in the flow path increases as air from the syringe is dispensed into the flow path, as indicated in the region 202. This repeated pattern results in the curves 204 of the graph 194 demonstrating pressure steps 206. It may be appreciated that, if the processor 100 determines that the fluidic system is not able to be pressurized to the target pressure, then the pressure test may be terminated with a failure indication.

Turning briefly back to FIG. 9, in certain implementations, the processor 100 may wait a predetermined amount of time to allow pressure to equilibrate (block 210) before proceeding with the process 190. As shown by the graph 194 of FIG. 10, while the curves 204 representing the pressures of the lanes L1-L4 closely trace one another and are not well-resolved, the curves differ from one another most during (and briefly after) the opening of the valving 130 of the syringe pump 124 (e.g., during the region 200). In certain implementations, rather than wait a predetermined amount of time, the processor 100 instead may wait until the pressure measurements received from each of the lanes L1-L4 are the same, within an acceptable tolerance.

Proceeding through the process 190 illustrated in FIG. 9, the processor 100 receives measurement data from at least one of the pressure sensors 122 positioned along the selected flow path to determine a first pressure (block 212). The processor 100 then waits a predetermined amount of time to allow the pressure to decay (block 214) before receiving measurement data from at least one of the sensors on selected flow path to determine a second pressure (block 216). Returning to FIG. 10, the measurement region 220 is indicated on the graph 194 and includes the actions set forth in blocks 212, 214, and 216 of FIG. 9. As illustrated, the first pressure measurement is collected (indicated by the arrow 222), and after a predetermined amount of time passes (measurement or decay time, indicated by the region 224), the second pressure measurement is collected (indicated by the arrow 226). For example, the predetermined amount of time should be sufficiently long to enable the detection of a leak rate greater than a predetermined threshold (e.g., approximately 0.02 psi/sec at approximately 18 psig), in accordance with the speed and resolution of the pressure sensors 122 of the fluidic system 120. In other implementations, any suitable number of pressure measurements may be collected by the processor 100 from any suitable number of pressure sensors 122 to determine the leak rate.

As illustrated in FIG. 9, after collecting the second pressure measurement, the processor 100 continues through the process 190 by sending control signals to move the common line selection valve 68, actuate valving 130 and/or syringes 126 of at least one of the syringe pumps 124 to evacuate the pressurized air from the flow path (block 230). This corresponds to the post-measurement region 232 indicated in the graph 194 of FIG. 10. More specifically, the post-measurement region 232 includes repeated cycles with time periods 234 during which pressure decreases as air from the flow path is aspirated into the syringe, followed by time periods 236 when pressure in the flow path is relatively constant as air is aspirated from the syringe 126 and into the atmosphere after the syringe input/output is switched from the flow path to the air inlet, for example. The process 190 illustrated in FIG. 9 concludes with the processor 100 calculating leak rate based on the first and second pressure measurements (block 240). For example, the processor 100 may calculate the leak rate by dividing the difference between the first and second pressure measurements by the measurement time.

As mentioned above with respect to block 188 of FIG. 8, the processor 100 is capable of sending control signals to suitably orient the common line selection valve 68 and/or the regent selection valve 66 to isolate the flow path to be pressure tested. FIGS. 11-14 are diagrammatical overviews of particular isolated flow paths of the implementation of the fluidic system 120 of FIG. 4 undergoing pressure testing in different configurations. In the figures, the components of the flow path being pressure tested are bolded or highlighted.

Figure 11:
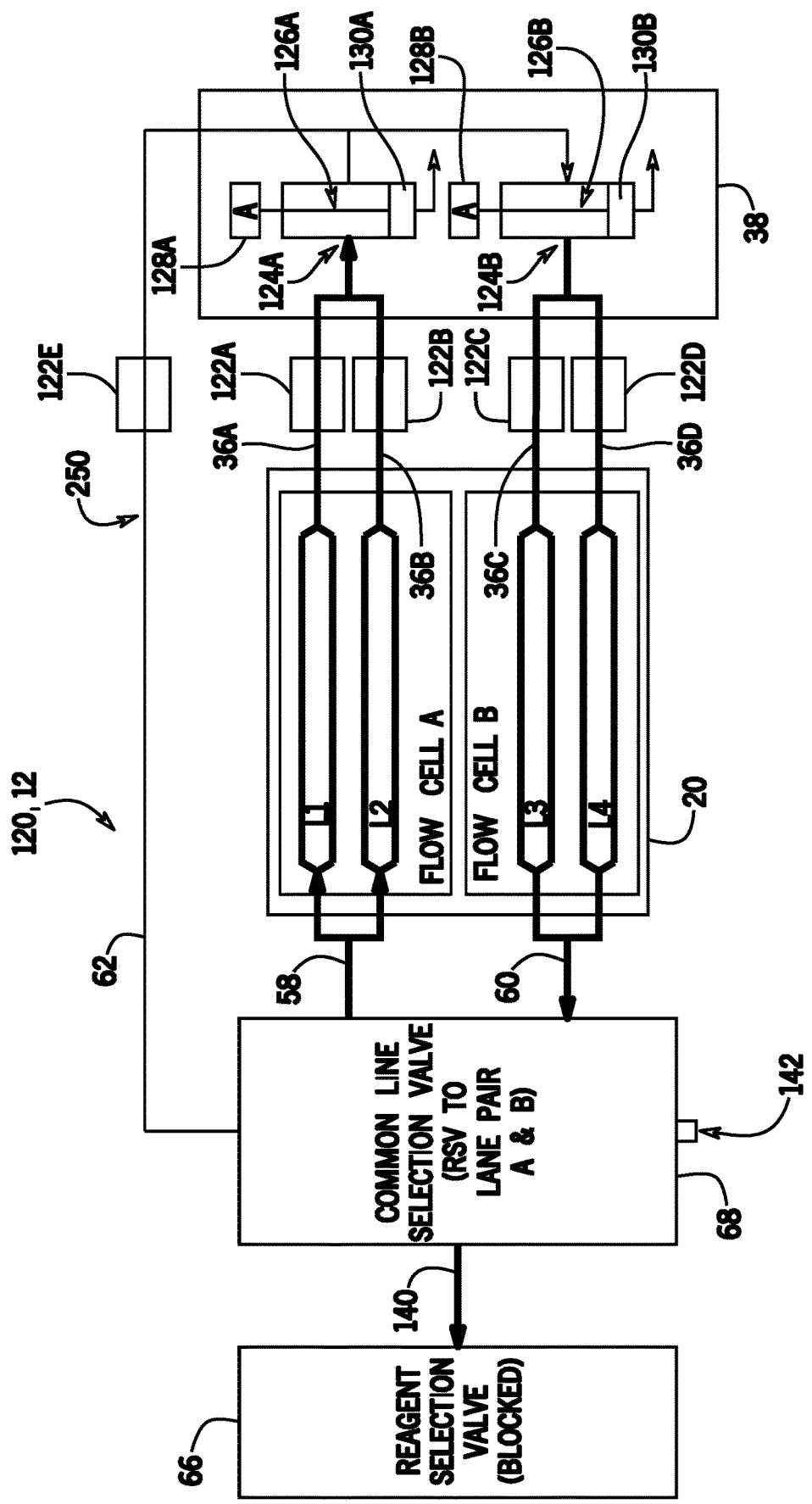
FIGS. 11-14 are diagrammatical overviews of implementations of flow paths of the of the example fluidic system of FIG. 4 undergoing pressure testing different flow paths in different configurations.

FIG. 11 indicates an example of a flow path 250 of the fluidic system 120 that can be pressure tested when both lane pairs A and B are present in the flow cell 20. The illustrated flow path 250 includes the first and second common line 58 and 60, the lanes L1, L2, L3 and L4 of lane pairs A and B, the effluent lines 36A-D, and the syringe pumps 124. As illustrated, reagent selection valve 66 is in a closed or blocked position, the common line selection valve 68 is in the RSV to Lane Pairs A & B position illustrated in FIG. 6C, and the valving 130A of the syringe pump 124A is in a closed or blocked position. Furthermore, the valving 130B of the syringe pump 124B is in the B position, and the actuator 128B and the valving 130B are suitably actuated to aspirate air through the bypass port 138 and then dispense the air through the lane pair port 134, as discussed above with respect to FIG. 5C. The common line selector valve 68 may be actuated, in tandem, to switch between fluidically connecting the bypass line 62/bypass port 138 with the air inlet 142 (for air aspiration) and fluidically connecting the lane pairs A/B with the reagent flow path 140 (for pressure testing). Alternatively, the bypass port of the valving 130B may instead not be fluidically connected with the bypass line, but may simply connect with ambient air, allowing air to be aspirated directly into the syringe pump 124B without needing to use the bypass line 62 or actuate the common line selector valve 68. Accordingly, the entire flow path indicated in FIG. 11 can be pressure tested in the manner set forth above.

Figure 12:
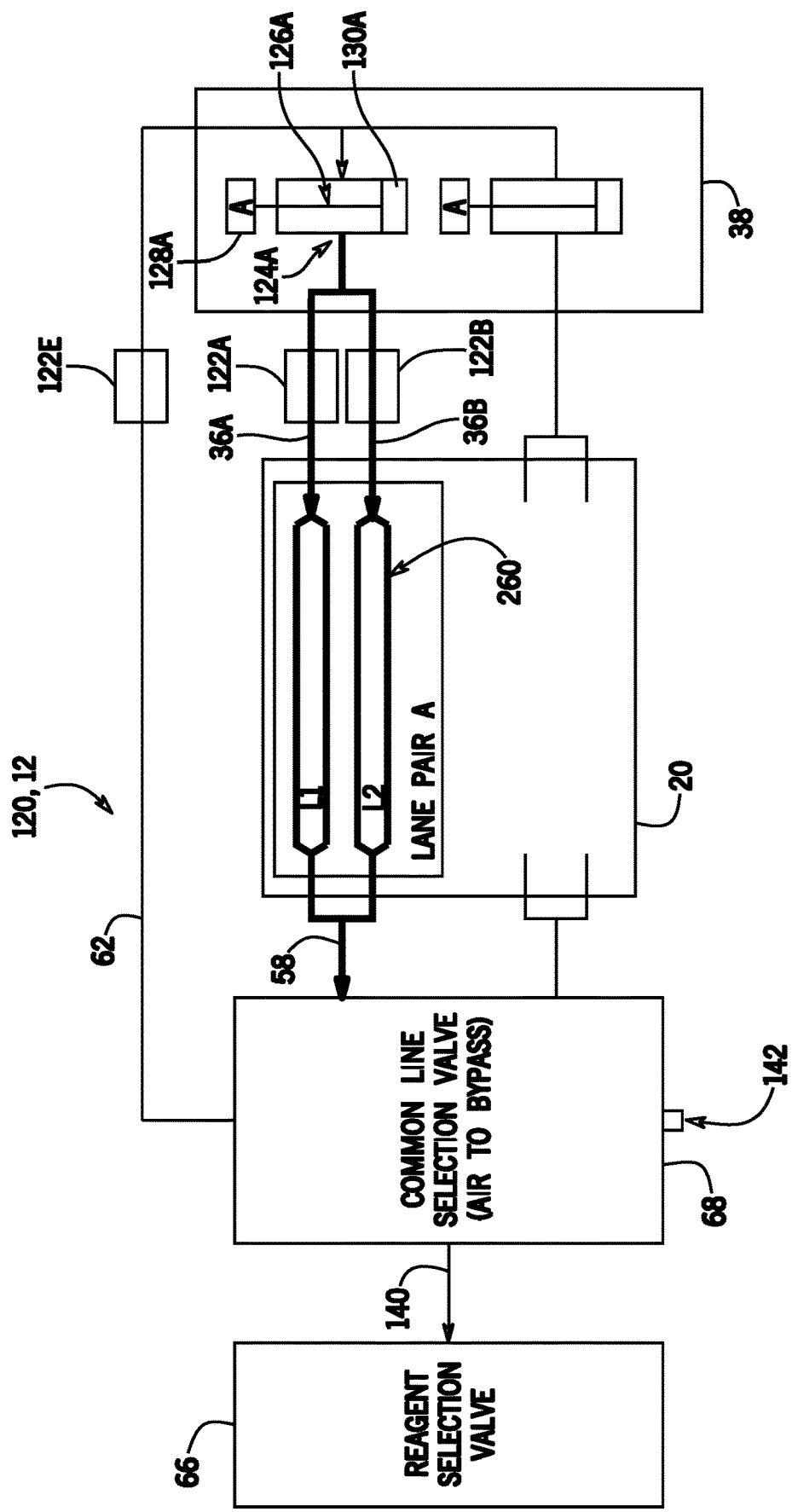

FIG. 12 indicates an example of a flow path 260 of the fluidic system 120 that can be pressure tested when only lane pair A is present or loaded into the flow cell array 20. The illustrated flow path 260 includes the first common line 58, the lanes L1 and L2 of lane pair A, effluent lines 36A and 36B, and syringe pump 124A. As illustrated, the common line selection valve 68 is in the Air to Bypass position illustrated in FIG. 6E. Furthermore, the valving 130A of the syringe pump 124A is in the B position, and the actuator 128A is suitably actuated to aspirate air through the bypass port 138 and then dispense the air through the flow cell port 134 after the valving 130A is actuated to connect with the effluent lines 36A and 36B, as discussed above with respect to FIGS. 5C and 5A. Accordingly, the entire flow path 260 indicated in FIG. 12 can be pressure tested in the manner set forth above.

Figure 13:
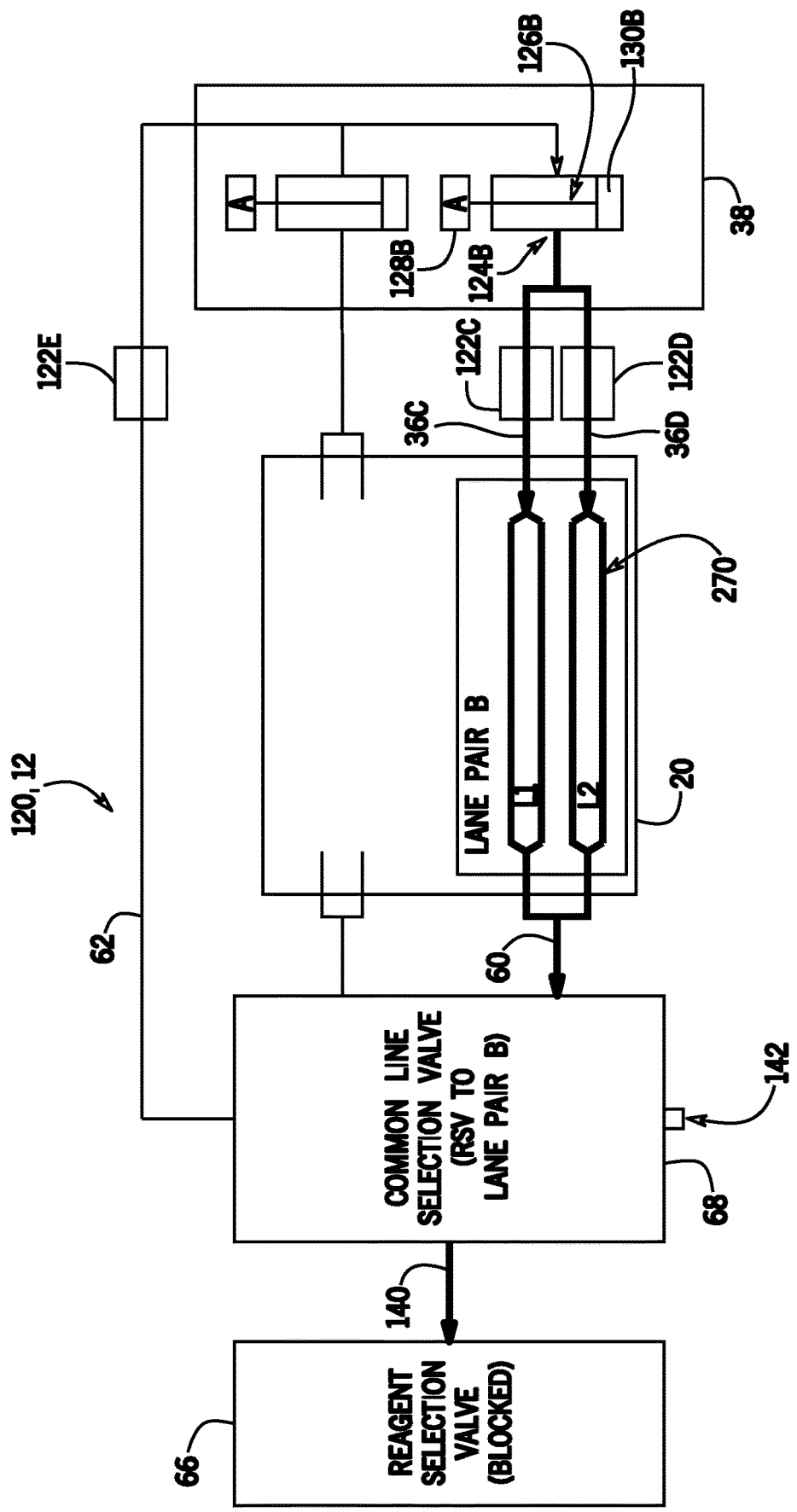

FIG. 13 indicates an example of a flow path 270 of the fluidic system 120 that can be pressure tested when only lane pair B is present or loaded into the flow cell array 20. The illustrated flow path 270 includes the reagent flow path 140, the second common line 60, the lanes L3 and L4 of lane pair B, effluent lines 36C and 36D, and syringe pump 124B. As illustrated, the reagent selection valve 66 is in a closed or blocked position, the common line selection valve 68 is in the RSV to Lane Pair B position illustrated in FIG. 6B. Furthermore, the valving 130B of the syringe pump 124B is in the B position, and the actuator 128B is suitably actuated to aspirate air through the bypass port 138 and dispense the air through the flow cell port 134 when the valve 130B is then actuated to the I position (see FIG. 5A). The common line selector valve 68 may be actuated, in tandem, to switch between fluidically connecting the bypass line 62/bypass port 138 with the air inlet 142 (for air aspiration) and fluidically connecting lane pair B with the reagent flow path 140 (for pressure testing). Alternatively, in some implementations, the valving 130B may have a bypass port that simply opens onto ambient air and is not fluidically connected with the bypass line 62, thereby allowing air to be aspirated directly into the syringe pump 124B through the bypass port without traveling through the bypass line and without acti- vation of the common line selector valve 68. Accordingly, the entire flow path 270 indicated in FIG. 13 can be pressure tested as set forth above.

Figure 14:
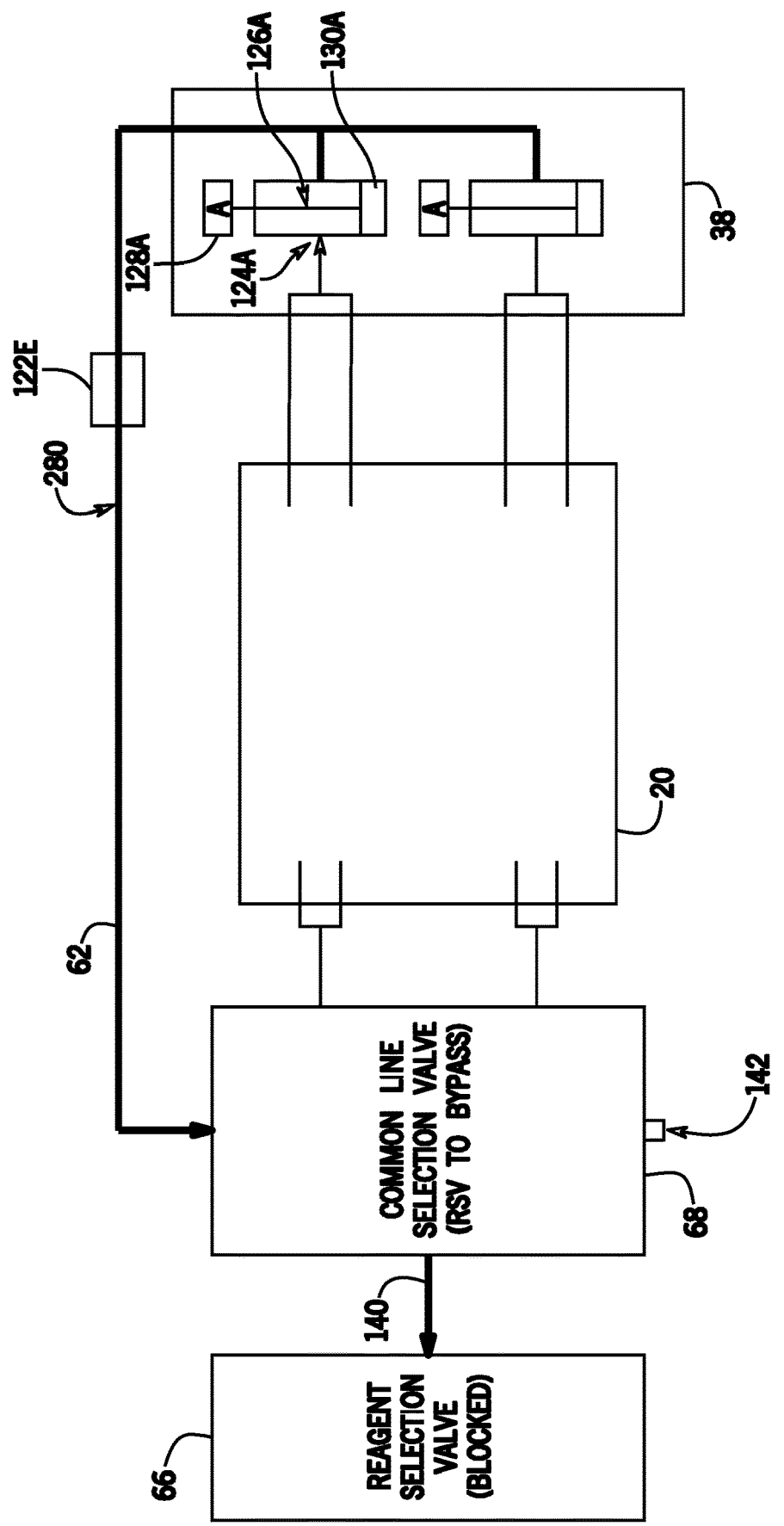

FIG. 14 indicates an example of a flow path 280 of the fluidic system 120 that can be pressure tested when no lane pairs are loaded into the flow cell array 20. The illustrated flow path 280 includes the bypass line 62, the reagent flow path 140, and syringe pump 124A. As illustrated, the reagent selection valve 66 is in a closed or blocked position, the common line selection valve 68 is in the RSV to Bypass position illustrated in FIG. 6F. Furthermore, the valving 130A of the syringe pump 124A is in the B position, and the actuator 128A is suitably actuated to aspirate air through the flow cell port 134 and dispense the air through the bypass port 138. The common line selector valve 68 may be actuated, in tandem, to switch between fluidically connecting the bypass line 62/bypass port 138 with the air inlet 142 (for air aspiration) and fluidically connecting the bypass line 62 with the reagent flow path 140 (for pressure testing). Accordingly, the entire flow path 280 indicated in FIG. 14 can be pressure tested in the manner described above. It is to be understood that in the above examples, the same tests may be run even if one or both of the flow lane sets that are described as not being present actually are present. For example, if both sets of flow lanes are present, each set may be individually pressure tested. This may, for example, be of use when there is a leak detected—individual flow lane tests may be run to try and narrow down where the leak is. It is also to be understood that different segments of the flow paths may be tested in other combinations, e.g., the flow path 140 may be added or omitted from any of the flow paths in any of the above pressure tests. It is to be further understood that the flow paths used (and the valving actuated in order to establish such flow paths) in order to aspirate air into the pumps for pressure testing may vary from what is discussed above—in implementations where multiple pumping cycles are needed to adequately pressurize the selected flow paths, any combination of flow paths may be used to convey air to the pumps for pressurization of the tested flow path, as long as the flow path(s) used for air aspiration is kept fluidically isolated from the flow path being tested.

It may be appreciated that pressurization of the flow path of the fluidic system 120 for pressure testing, as set forth in block 192 of FIG. 9, could reasonably be implemented using proportional pressure control mechanisms. However, it is presently recognized that proportional control can fail to be sufficiently robust to deal with the substantial differences between the volumes of the various flow paths of the fluidic system 120 that may be pressure tested, resulting in pressure test runs that fail to reach the target pressure and/or in which the pressure over-corrects and oscillates around the target pressure. As such, in certain implementations, the pressurization set forth in block 120 may be implemented using a proportional-integral-derivative controller (PID controller). For example, in certain implementations, effective pressure control for the disclosed pressure testing may incorporate the use of a robust system control method and a PID controller (e.g., integrated into or communicatively coupled to the processor 100) to achieve the target testing pressure in the flow path being tested. It is presently recognized that this configuration improves the ability of the fluidic system 120 to efficiently reach the target pressure while avoiding unnecessary pressure oscillations and pressure instabilities despite significant differences in the volumes of different flow paths of the fluidic system 120 that may be pressure tested.

Figure 15:
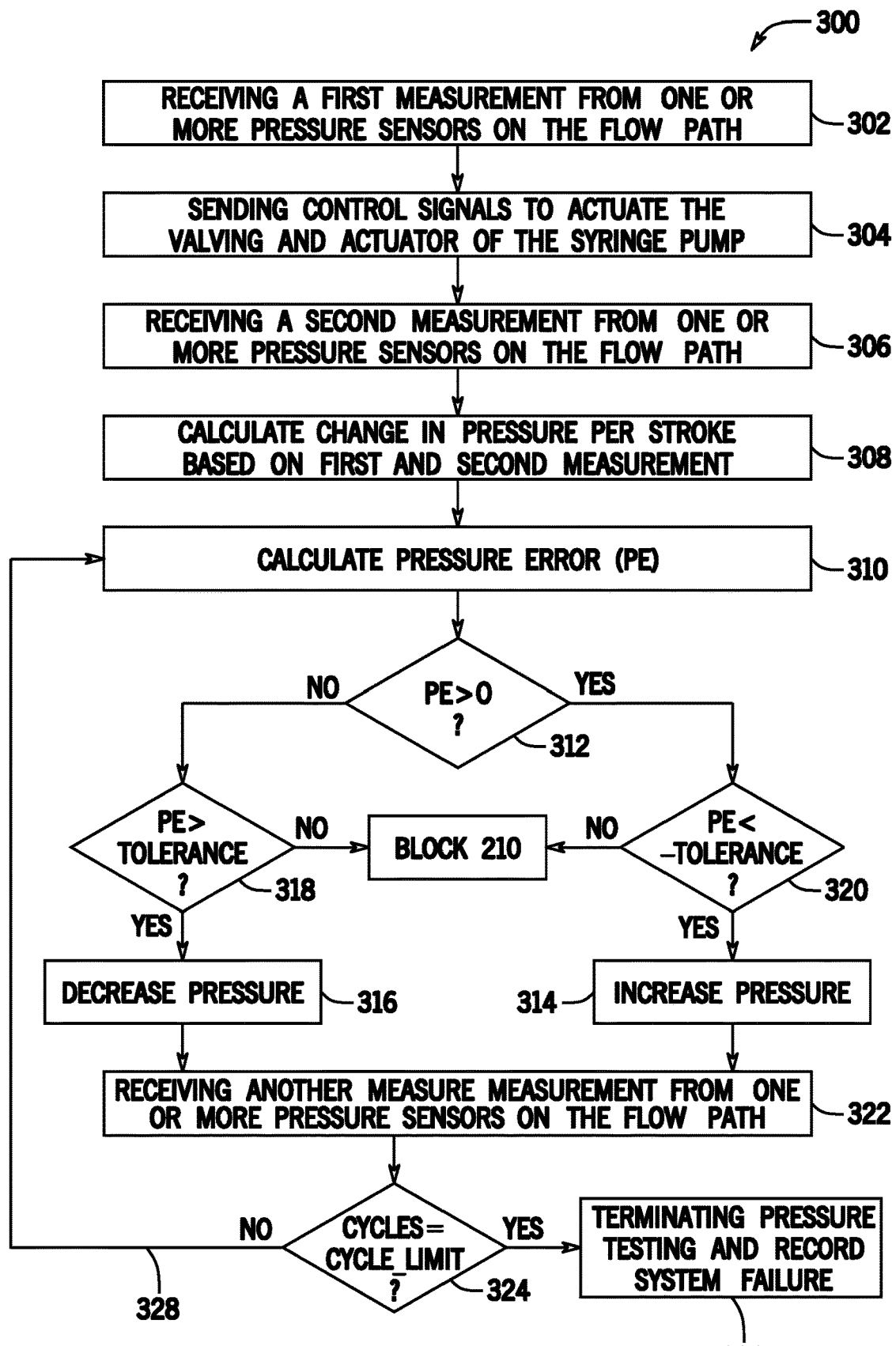
FIG. 15 is a flow diagram illustrating an implementation of an example system control method that involves the use of a proportional-integral-derivative controller (PID) to control pressurization of the flow path during pressure testing.

By specific example, in an implementation, the pressurization of block 192 in FIG. 9 may be implemented to suitably pressurize a flow path to a target pressure for leak testing, as presently disclosed. FIG. 15 is a flow diagram illustrating an implementation of a system control method 300 at least partially executable by a PID (e.g., part of processing circuitry 100) to perform the actions set forth in block 192 of FIG. 9. The illustrated method 300 begins with the processor 100 receiving (block 302) a first measurement from one or more pressure sensors 122A-122E disposed along the flow path being pressure tested. Subsequently, the processor 100 may send (block 304) control signals to suitably actuate the valving 130 and the actuator 128 of a syringe pump 124 to cause the syringe pump 124 to perform a single cycle or stroke to pressurize the flow path. The illustrated method 300 continues with the processor 100 receiving (block 306) a second measurement from one or more pressure sensors 122A-122E disposed along the flow path being pressure tested. Using the first and second measurements, the processor 100 may calculate (block 308) a change in pressure per stroke of the syringe pump 124.

The method 300 continues with the processor 100 calculating the PE (pressure error) (block 310), which is a value that is indicative of how aggressively the gap between the current pressure and the target pressure should be closed. In certain implementations, PE may be calculated according to equation 1:

$$PE = Gain_P*error + Gain_I*integral + Gain_D*derivative \quad \text{Eq. 1}$$

in which the values of GainP, GainI, and GainD are specific to the configuration of the fluidic system 120. For example, in certain implementations, GainP is approximately 1.0, GainI is approximately 0.016, and GainD is approximately 1.0; however, in other implementations, different values may be used. In the present context, the term "approximately" is intended to mean that the values indicated are not exact and the actual value may vary from those indicated (e.g., ±10%, ±5%, ±2%, or ±1%) in a manner that does not materially alter the operation concerned. In certain implementations, the GainP may be set to a small value to avoid overshooting the target pressure, while the GainI and GainD values are tuned to incrementally close in on the target pressure.

In certain implementations, the error, integral, and derivative values may be respectively calculated via the PID according to equations 2, 3, and 4:

$$error = target\_pressure - measured\_pressure, \quad \text{Eq. 2}$$

$$integral = integral_{previous} + error*\Delta t, \quad \text{Eq. 3}$$

$$derivative = \frac{(error - error_{previous})}{\Delta t}, \quad \text{Eq. 4}$$

where integralprevious is the previously calculated integral value, errorprevious is the previously calculated error value, and Δt is the time interval between error calculations (the "previous" values may initially be set to zero when the pressurization routine first begins). As indicated by block 312, a positive PE value may indicate that the pressure should be increased (block 314) to reach the target pressure, while a negative PE value may indicate that the pressure should be decreased (block 316) to reach the target pressure. However, before increasing or decreasing the pressure in the flow path, the processor 100 first determines whether the PE value is within a predetermined tolerance value (e.g., ±0.5 psig) of the target pressure. For example, as indicated in block 318, if processor 100 determines that the positive PE value not greater than the predetermined tolerance value, then the processor 100 may proceed to block 210 of the pressure testing method 190 illustrated in FIG. 9. Similarly, as indicated in block 320, if processor 100 determines that the negative PE value is greater than the negative predetermined tolerance value, then the processor 100 may also proceed to block 210.

If the processor 100 determines in block 318 that the positive PE value is greater than the predetermined tolerance value (e.g., 0.5 psig), then the processor 100 may provide suitable control signals to the syringe pump 124 to decrease the pressure in the flow path (block 316). Similarly, if the processor 100 determines in block 320 that the negative PE value is less than the negative predetermined tolerance value (e.g., -0.5 psig), then the processor 100 may provide suitable control signals to the syringe pump 124 to increase the pressure in the flow path (block 314). In both situations, the processor 100 may send control signals to actuate the valving 130 to enable the syringe pump 124 to aspirate air from a particular port (e.g., the flow cell port 134 or the bypass port 138), and again actuate the valving 130 to enable the syringe pump 124 to dispense the air into another particular port (e.g., the flow cell port 134 or the bypass port 138) to suitably increase or decrease the pressure in the flow path, as discussed above. Depending on the PE value, the processor 100 may utilize full strokes of the syringe pump 124 or may calculate a pump position that is less than a full stroke to reach the target pressure. For example, in certain implementations, the processor 100 may calculate the pump position according to equation 5:

$$PumpPosition = ROUND\left(ABS\left(\frac{Gain_P * PE}{dPdStep}\right)\right), \quad \text{Eq. 5}$$

where ROUND is a rounding function that rounds a real value to the nearest integer value, and ABS is an absolute value function. Additionally, dPdStep may be calculated according to equations 6:

$$dPdStep = ABS\left(\frac{\Delta P}{PumpPosition_{max}}\right), \quad \text{Eq. 6}$$

where ΔP is a difference between a current measured pressure (e.g., second measurement of block 306) and a previously measured pressure (e.g., first measurement of block 302) in the flow path, and PumpPositionmax is the maximum position of the actuator 130 of the syringe pump 124 (e.g., 6000 steps). Additionally, the processor 100 may keep a track of the number of cycles (e.g., full or partial strokes of the syringe pump 124) for each pressure increase (as set forth in block 314) and each pressure decrease (as set forth in block 316).

After actuating the syringe pump 124 to increase or decrease the pressure in the flow path, the method 300 continues with the processor 100 receiving another measurement from one or more pressure sensors 130A-E (block 322). Subsequently, the processor 100 may determine whether the number of cycles of the syringe pump 124 during the pressurization method 300 has exceeded a predetermined threshold value (e.g., 10 cycles) (block 324), and, if so, may terminate pressure testing with a failure indication (block 326). If, however, the processor 100 determines that the cycle limit has not yet been reached, then the processor may proceed back to block 310, as indicated by the arrow 328, and calculate PE once more based on the latest pressure measurement.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

It is also to be understood that the use of "to," e.g., "a valve to switch between two flow paths," may be replaceable with language such as "configured to," e.g., "a valve configured to switch between two flow paths", or the like.

Terms such as "about," "approximately," "substantially," "nominal," or the like, when used in reference to quantities or similar quantifiable properties, are to be understood to be inclusive of values within ±10% of the values specified, unless otherwise indicated.

In addition to the claims listed in this disclosure, the following additional implementations are to be understood to be within the scope of this disclosure:

Implementation 1: A system including: a flow cell to support analytes of interest; a selector valve coupled to the flow cell to select a flow path through the flow cell the flow path being one of a plurality of flow paths selectable by the selector valve; a pump coupled to the flow cell to pressurize a fluid in the selected flow path in accordance with a prescribed test protocol; a pressure sensor coupled to the flow path to detect pressure in the selected flow path and to generate pressure signals based on the detected pressure; and processing circuitry to access the pressure data and to determine whether the selected flow path maintains pressure in a desired manner.

Implementation: 2: The system of implementation 1, in which the pump includes a syringe pump.

Implementation: 3: The system of implementation 1, in which the fluid includes air.

Implementation: 4: The system of implementation 1, in which the pump pressurizes the selected flow path in a plurality of pressure steps.

Implementation: 5: The system of implementation 1, in which the selector valve successively selects different flow paths of the plurality of flow paths through the flow cell to be pressure tested in accordance with the prescribed test protocol.

Implementation: 6: The system of implementation 5, in which the plurality of flow paths includes a first flow path through one channel of the flow cell, and a second flow path through a second channel of the flow cell different from the first flow path.

Implementation: 7: The system of implementation 6, in which the plurality of flow paths includes a third flow path that includes both the first and the second flow paths.

Implementation: 8: The system of implementation 1, in which the selector valve is coupled to a bypass line that bypasses the flow cell, and in which the selector valve also selects the bypass line to be pressure tested in accordance with the prescribed test protocol.

Implementation: 9: The system of implementation 1, including a second valve coupled to the selector valve to fluidly isolate the selected flow path for pressure testing.

Implementation: 10: A system including: a flow cell to support analytes of interest; a selector valve coupled to the flow cell to select a flow path through the flow cell the flow path being one of a plurality of flow paths selectable by the selector valve; a pump coupled to the flow cell to pressurize a fluid in the selected flow path in accordance with a prescribed test protocol; a pressure sensor coupled to the flow path to detect pressure in the selected flow path and to generate pressure signals based on the detected pressure; and processing circuitry to command the selector valve successively to select different flow paths of the plurality of flow paths through the flow cell in accordance with the prescribed test protocol, and to access the pressure data and to determine whether each of the selected flow paths maintains pressure in a desired manner.

Implementation: 11: The system of implementation 10, in which the fluid includes air.

Implementation: 12: The system of implementation 10, in which the pump pressurizes each of the selected flow paths in a plurality of pressure steps.

Implementation: 13: The system of implementation 10, in which the plurality of flow paths includes a first flow path through one channel of the flow cell, and a second flow path through a second channel of the flow cell different from the first flow path.

Implementation: 14: The system of implementation 13, in which the plurality of flow paths includes a third flow path that includes both the first and the second flow paths.

Implementation: 15: The system of implementation 10, in which the selector valve is coupled to a bypass line that bypasses the flow cell, and in which the selector valve also selects the bypass line to be pressure tested in accordance with the prescribed test protocol.

Implementation: 16: A method including: implementing a stored prescribed test protocol that includes: (a) selecting a flow path from a plurality of flow paths through a flow cell in accordance with a prescribed test protocol; (b) actuating a pump to pressurize a fluid in the selected flow path; (c) generating pressure data representative of the pressure in the selected flow path; and (d) processing the pressure data to determine whether the selected flow path maintains pressure in a desired manner.

Implementation: 17: The method of implementation 16, in which the pump pressurizes the selected flow path in a plurality of pressure steps.

Implementation: 18: The method of implementation 16, including repeating (a)-(d) for different flow paths through the flow cell to separately determine whether each selected flow path maintains pressure in a desired manner.

Implementation: 19: The method of implementation 18, in which the plurality of flow paths includes a first flow path through one channel of the flow cell, and a second flow path through a second channel of the flow cell different from the first flow path.

Implementation: 20: The method of implementation 18, in which the selector valve is coupled to a bypass line that bypasses the flow cell, and in which the selector valve also selects the bypass line to be pressure tested in accordance with the prescribed test protocol.

It should be appreciated that all combinations of the foregoing concepts (provided such concepts are not mutually inconsistent) are contemplated as being part of the inventive subject matter disclosed herein. All combinations of the claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

What is claimed is:

1. A system comprising:
an interface to fluidically connect with a flow cell to support analytes of interest in an analysis system, the fluidic interface including a plurality of flow paths and a plurality of effluent lines, each flow path to fluidically connect with one or more channels of the flow cell when the flow cell is mounted in the analysis system and each effluent line to fluidically connect with one of the channels of the flow cell when the flow cell is mounted in the analysis system;
a selector valve fluidically connected with plurality of flow paths, the selector valve to controllably select one of the flow paths;
one or more pumps, each pump fluidically connected with one or more of the effluent lines;
a pressure sensor in fluidic communication with the selected flow path, the pressure sensor to detect pressure in the selected flow path and to generate pressure data based on the detected pressure; and
control circuitry, the control circuity having one or more processors and a memory to store computer-executable instructions which, when executed by the one or more processors, control the one or more processors to:
cause the selector valve to successively select different flow paths of the plurality of flow paths to be pressure-tested in accordance with a prescribed test protocol;
control the one or more pumps so as to pressurize the selected flow path according to the prescribed test protocol; and
access the pressure data and to determine whether each of the selected flow paths maintains pressure in a desired manner.

2. The system of claim 1, wherein the one or more pumps comprises at least one syringe pump.

3. The system of claim 1, wherein the fluid comprises air.

4. The system of claim 1, wherein the memory is to store further computer-executable instructions which, when executed by the one or more processors, further control the one or more processors to cause the one or more pumps to pressurize the selected flow path in a stepwise manner, with each pressure step having a higher pressure than the previous pressure step.

5. The system of claim 1, wherein the plurality of flow paths comprises a first flow path through one channel of the flow cell when the flow cell is mounted to the interface, and a second flow path through a second channel of the flow cell when the flow cell is mounted to the interface, the second flow path different from the first flow path.

6. The system of claim 5, wherein the plurality of flow paths comprises a third flow path that includes both the first and the second flow paths.

7. The system of claim 1, wherein the selector valve is further fluidically connected with a bypass line that bypasses the flow cell, and wherein the memory is to store further computer-executable instructions which, when executed by the one or more processors, further control the one or more processors to cause the selector valve to select the bypass line to be pressure-tested in accordance with the prescribed test protocol.

8. The system of claim 1, further comprising a second valve that is fluidically connected with an inlet to the selector valve, the second valve to seal the selected flow path at the second valve for pressure-testing of the selected flow path between the second valve and the pump.

9. A system comprising:
an interface to fluidically connect with a flow cell to support analytes of interest in an analysis system, the fluidic interface including a plurality of flow paths and a plurality of effluent lines, each flow path to fluidically connect with one or more channels of the flow cell when the flow cell is mounted in the analysis system and each effluent line to fluidically connect with one of the channels of the flow cell when the flow cell is mounted in the analysis system;
a flow path selector valve fluidically connected with the plurality of flow paths, the flow path selector valve to controllably select one of the flow paths;
one or more pumps, each pump fluidically connected with one or more of the effluent lines;
a reagent selector valve fluidically connected with an inlet to the flow path selector valve, the reagent selector valve to seal the selected flow path at the reagent selector valve for pressure-testing of the selected flow path between at least the reagent selector valve and the one or more pumps;
a pressure sensor in fluidic communication with the selected flow path, the pressure sensor to detect pressure in the selected flow path and to generate pressure data based on the detected pressure; and
control circuitry, the control circuity having one or more processors and a memory to store computer-executable instructions which, when executed by the one or more processors, control the one or more processors to:
control the one or more pumps so as to pressurize the selected flow path according to a prescribed test protocol; and
access the pressure data and to determine whether the selected flow path maintains pressure in a desired manner.

10. The system of claim 9, wherein the one or more pumps comprises at least one syringe pump.

11. The system of claim 9, wherein the fluid comprises air.

12. The system of claim 9, wherein the memory is to store further computer-executable instructions which, when executed by the one or more processors, further control the one or more processors to cause the one or more pumps to pressurize the selected flow path in a stepwise manner, with each pressure step having a higher pressure than the previous pressure step.

13. The system of claim 9, wherein the memory is to store further computer-executable instructions which, when executed by the one or more processors, further control the one or more processors to cause the selector valve to successively select different flow paths of the plurality of flow paths to be pressure-tested in accordance with the prescribed test protocol.

14. The system of claim 13, wherein the plurality of flow paths comprises a first flow path through one channel of the flow cell when the flow cell is mounted to the interface, and a second flow path through a second channel of the flow cell when the flow cell is mounted to the interface, the second flow path different from the first flow path.

15. The system of claim 14, wherein the plurality of flow paths comprises a third flow path that includes both the first and the second flow paths.

16. The system of claim 9, wherein the selector valve is further fluidically connected with a bypass line that bypasses the flow cell, and wherein the memory is to store further computer-executable instructions which, when executed by the one or more processors, further control the one or more processors to cause the selector valve to select the bypass line to be pressure-tested in accordance with the prescribed test protocol.

17. A system comprising:
an interface to fluidically connect with a flow cell to support analytes of interest in an analysis system, the fluidic interface including a plurality of flow paths and a plurality of effluent lines, each flow path to fluidically connect with one or more channels of the flow cell when the flow cell is mounted in the analysis system and each effluent line to fluidically connect with one of the channels of the flow cell when the flow cell is mounted in the analysis system;
a selector valve fluidically connected with plurality of flow paths, the selector valve to controllably select one of the flow paths;
one or more pumps, each pump fluidically connected with one or more of the effluent lines;
a pressure sensor in fluidic communication with the selected flow path, the pressure sensor to detect pressure in the selected flow path and to generate pressure data based on the detected pressure; and
control circuitry, the control circuity having one or more processors and a memory to store computer-executable instructions which, when executed by the one or more processors, control the one or more processors to:
control the one or more pumps so as to dry the selected flow path;
control the one or more pumps so as to pressurize the selected flow path according to a prescribed test protocol; and
access the pressure data and to determine whether the selected flow path maintains pressure in a desired manner.

18. The system of claim 17, further comprising an air inlet fluidically connected with the selector valve, wherein the memory is to store further computer-executable instructions which, when executed by the one or more processors, further control the selector valve to fluidically couple the air inlet to the selected flow path.

19. The system of claim 18, wherein the computer-executable instructions to control the one or more pumps so as to dry the selected flow path further include controlling the one or more pumps to draw liquid from the selected flow path and draw air through the air inlet.

20. The system of claim 17, wherein the fluid comprises air.

* * * * *

UNITED STATES PATENT AND TRADEMARK OFFICE
CERTIFICATE OF CORRECTION

PATENT NO. : 11,002,629 B2
APPLICATION NO. : 16/551580
DATED : May 11, 2021
INVENTOR(S) : Bradley Kent Drews and Kevin James Cappa It is certified that error appears in the above-identified patent and that said Letters Patent is hereby corrected as shown below:

On the Title Page

Column 2, In Line 1 Item (57) of the abstract, please delete "a fluidic system includes.".

In the Claims

Claim 1 (Column 21, Line 32) delete "circuity" and insert -- circuitry --, therefor.

Claim 8 (Column 22, Line 9) delete "pressure-testing" and insert -- pressure testing --, therefor.

Claim 9 (Column 22, Line 30) delete "pressure-testing" and insert -- pressure testing --, therefor.

Claim 9 (Column 22, Line 37) delete "circuity" and insert -- circuitry --, therefor.

Claim 17 (Column 24, Line 3) delete "circuity" and insert -- circuitry --, therefor.

Signed and Sealed this
Fifth Day of October, 2021

Drew Hirshfeld
*Performing the Functions and Duties of the
Under Secretary of Commerce for Intellectual Property and
Director of the United States Patent and Trademark Office*